US 9,499,110 B2
Nov. 22, 2016

(12) United States Patent
Takahashi et al.

(10) Patent No.: US 9,499,110 B2
(45) Date of Patent: Nov. 22, 2016

(54) AUTOMOTIVE INSTRUMENT OPERATING DEVICE AND ALERT DEVICE

(75) Inventors: Akio Takahashi, Tochigi-ken (JP); Shinsuke Ueda, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 151 days.

(21) Appl. No.: 14/124,054

(22) PCT Filed: Apr. 11, 2012

(86) PCT No.: PCT/JP2012/059854
§ 371 (c)(1),
(2), (4) Date: Dec. 5, 2013

(87) PCT Pub. No.: WO2012/176535
PCT Pub. Date: Dec. 27, 2012

(65) Prior Publication Data
US 2014/0129082 A1    May 8, 2014

(30) Foreign Application Priority Data

Jun. 20, 2011  (JP) ................................ 2011-135849
Sep. 22, 2011  (JP) ................................ 2011-206857

(51) Int. Cl.
*B60R 16/027*    (2006.01)
*B60R 1/12*      (2006.01)
(Continued)

(52) U.S. Cl.
CPC ............ *B60R 16/027* (2013.01); *B60K 35/00* (2013.01); *B60K 37/06* (2013.01); *B60R 1/12* (2013.01);
(Continued)

(58) Field of Classification Search
CPC ............ B60K 35/00; B60K 2350/2013; B60K 2350/1096; B60K 2350/928; B60K
(Continued)

(56) References Cited

U.S. PATENT DOCUMENTS 4,158,483 A * 6/1979 Fisher .................... B60R 1/072
                                                    359/876
6,397,137 B1 * 5/2002 Alpert .................... B60R 1/07
                                                    351/209
(Continued)

FOREIGN PATENT DOCUMENTS

JP    2010-076602    4/2010
JP    2010-105417    5/2010
(Continued)

OTHER PUBLICATIONS

Mitsuyoshi et al., JP2007-038790, Feb. 15, 2007 (Machine Translation).*

*Primary Examiner* — Courtney Heinle
(74) *Attorney, Agent, or Firm* — Rankin, Hill & Clark LLP

(57) ABSTRACT

An automotive instrument specifying unit of an automotive instrument operating device specifies a group of automotive instruments on the basis of the direction of gaze of an occupant detected by a gaze direction detector, and specifies one automotive instrument from among the specified group of automotive instruments on the basis of the up/down direction selected by up/down direction selecting unit when the up/down direction selecting unit has been operated in a state in which the group of automotive instruments has been specified.

11 Claims, 44 Drawing Sheets

(51) Int. Cl.
  *B60K 35/00* (2006.01)
  *B60K 37/06* (2006.01)
  *G06K 9/00* (2006.01)

(52) U.S. Cl.
  CPC ... *G06K 9/00845* (2013.01); *B60K 2350/1096* (2013.01); *B60K 2350/2013* (2013.01); *B60K 2350/928* (2013.01); *B60R 2001/1215* (2013.01); *B60R 2001/1223* (2013.01)

(58) Field of Classification Search
  CPC .................. 37/06; B60R 16/027; B60R 1/12; B60R 2001/1215; B60R 2001/1223; G06K 9/00845
  USPC .......................................................... 701/36
  See application file for complete search history.

(56) References Cited

U.S. PATENT DOCUMENTS

| | | | | |
|---|---|---|---|---|
| 6,668,221 B2* | 12/2003 | Harter, Jr. | ............... | B60K 35/00 701/36 |
| 2003/0023353 A1* | 1/2003 | Badarneh | ............... | B60K 35/00 701/1 |
| 2003/0181822 A1* | 9/2003 | Victor | ................... | A61B 3/113 600/558 |
| 2004/0150514 A1* | 8/2004 | Newman | ................ | B60Q 9/008 340/435 |
| 2005/0247549 A1* | 11/2005 | Wahl | ...................... | B62D 1/046 200/61.54 |
| 2009/0310818 A1* | 12/2009 | Lee | ........................... | C23C 8/22 382/100 |
| 2009/0318069 A1* | 12/2009 | Konet | ................... | B60H 1/3428 454/155 |
| 2010/0121645 A1* | 5/2010 | Seitz | ..................... | B60K 35/00 704/275 |
| 2010/0238280 A1* | 9/2010 | Ishii | ....................... | B60K 35/00 348/77 |
| 2010/0324779 A1* | 12/2010 | Takahashi | ............. | B60K 37/06 701/36 |
| 2012/0300061 A1* | 11/2012 | Osman | ................... | G06F 1/3231 348/135 |
| 2013/0076615 A1* | 3/2013 | Iao | .......................... | G06F 3/017 345/156 |
| 2013/0076881 A1* | 3/2013 | Takahashi | .......... | G06K 9/00268 348/77 |

FOREIGN PATENT DOCUMENTS

| | | |
|---|---|---|
| JP | 2011-957 | 1/2011 |
| JP | 2011-116248 | 6/2011 |

* cited by examiner

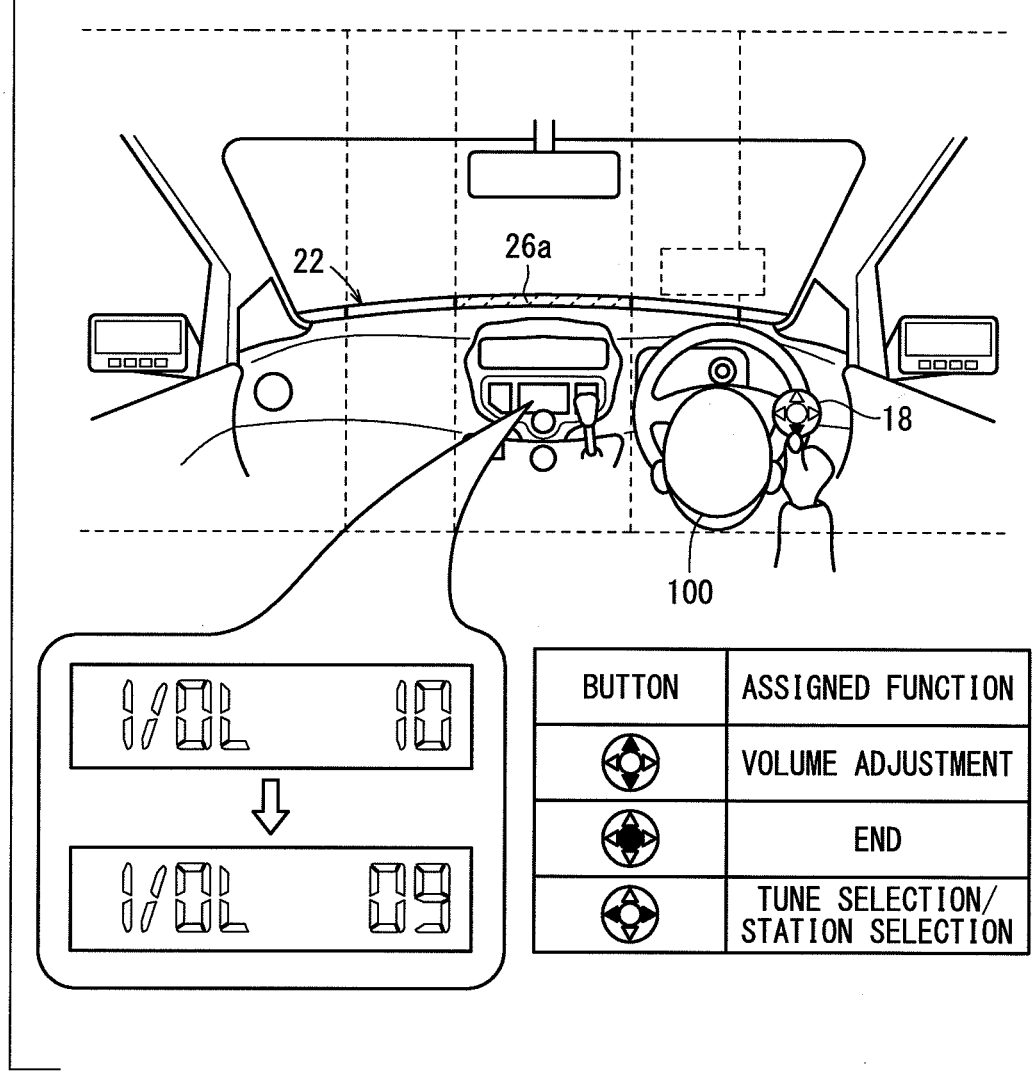

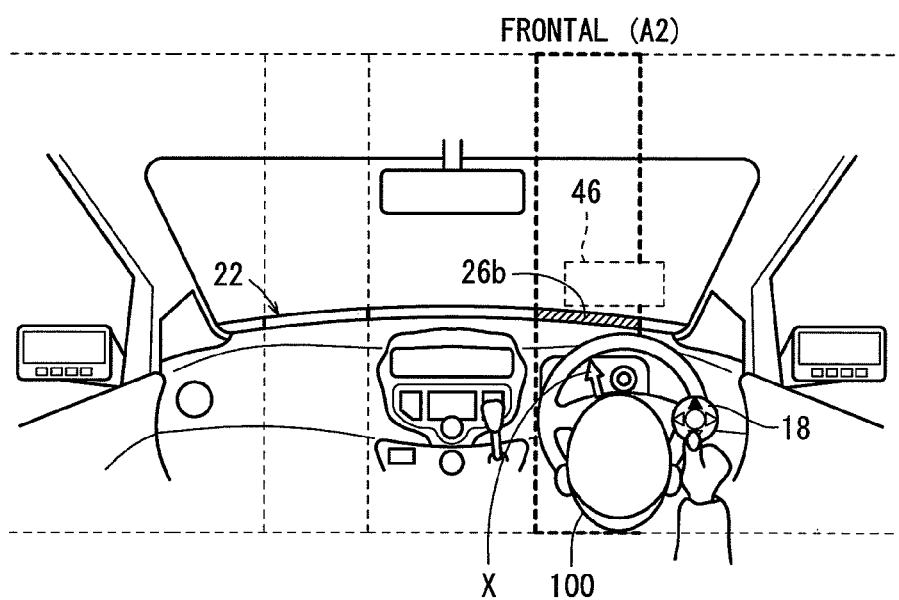

LEFT (A4)

| BUTTON | SELECTION CANDIDATE EQUIPMENT |
|--------|-------------------------------|
| ⊕ | WINDOW |
| ⊕ | REAR LIGHT |
| ⊕ | DOOR MIRROR |

FIG. 9

CENTRAL

NAVI: ① PRESS UPPER BUTTON 32 WHILE FACING IN CENTRAL DIRECTION.
② PRESS UPPER BUTTON 32 FOR SCALING UP, PRESS LOWER BUTTON 34 FOR SCALING DOWN, AND PRESS LEFT BUTTON 36 AND RIGHT BUTTON 38 TO CHANGE MAP DIRECTIONS (NORTHWARD ⇔ DIRECTION OF TRAVEL).

AUDIO: ① PRESS CENTRAL BUTTON 30 WHILE FACING IN CENTRAL DIRECTION.
② PRESS UPPER BUTTON 32 AND LOWER BUTTON 34 FOR VOLUME ADJUSTMENT, AND PRESS LEFT AND RIGHT BUTTONS 36, 38 FOR SELECTING TUNE OR STATION (FOR CD OR RADIO, TUNE OR STATION BEING SELECTED IS CONTROLLED).

AIRCON: ① PRESS LOWER BUTTON 34 WHILE FACING IN CENTRAL DIRECTION.
② PRESS UPPER BUTTON 32 AND LOWER BUTTON 34 FOR TEMPERATURE ADJUSTMENT, AND PRESS LEFT AND RIGHT BUTTONS 36, 38 FOR AIR FLOW ADJUSTMENT.

FRONTAL

HUD: ① PRESS UPPER BUTTON 32 WHILE FACING IN CENTRAL DIRECTION (ACTIVATING HUD).
② PRESS UPPER BUTTON 32 AND LOWER BUTTON 34 FOR SUCCESSIVELY DISPLAYING SPEED, DISTANCE, FUEL CONSUMPTION, AMOUNT OF GASOLINE, ETC.

HAZARD: ① PRESS CENTRAL BUTTON 30 WHILE FACING IN CENTRAL DIRECTION (BLINKING HAZARD LAMP).

SEAT: ① PRESS LOWER BUTTON 34 WHILE FACING IN CENTRAL DIRECTION (MAKING SEAT SLIDING AND RECLINING FUNCTION STAND BY).
② PRESS UPPER BUTTON 32 AND LOWER BUTTON 34 FOR FORE-AND-AFT SLIDING ADJUSTMENT, AND PRESS LEFT AND RIGHT BUTTONS 36, 38 FOR RECLINING ANGLE ADJUSTMENT.

LEFT AND RIGHT

DOOR MIRRORS: ① PRESS LEFT BUTTON 36 (RIGHT BUTTON 38) WHILE FACING IN RIGHTWARD (LEFTWARD) DIRECTION, FOLDING MIRRORS.
PRESS RIGHT BUTTON 38 (LEFT BUTTON 36) TO UNFOLD MIRRORS.

REAR LIGHTS: ① PRESS CENTRAL BUTTON 30 WHILE FACING IN RIGHTWARD (LEFTWARD) DIRECTION, TURNING ON REAR LIGHTS.

POWER WINDOWS: ① PRESS UPPER BUTTON 32 OR LOWER BUTTON 34 WHILE FACING IN RIGHTWARD (LEFTWARD) DIRECTION, OPENING OR CLOSING WINDOWS.

FINISH WITH CENTRAL BUTTON 30 (EXCEPT FOR MIRRORS).

FIG. 10

| CONTROL BUTTONS TO BE PRESSED FOR SELECTING EQUIPMENT | TARGET PIECE OF EQUIPMENT | FUNCTIONS PERFORMED WHEN PIECE OF EQUIPMENT IS SELECTED | ASSIGNED BUTTONS AFTER PIECE OF EQUIPMENT IS SELECTED | | |
|---|---|---|---|---|---|
| | | | ● (center) | ◆ (up/down) | ◆ (left/right) |
| ◆ | NAVI | — | END | SCALING ADJUSTMENT | MAP DIRECTIONS CHANGING |
| ● | AUDIO | — | END | VOLUME ADJUSTMENT | TUNE SELECTION (STATION SELECTION) |
| ◆ | AIRCON | — | END | TEMPERATURE ADJUSTMENT | AIR FLOW ADJUSTMENT |
| ◆ | HUD | HUD ACTIVATED | END | DISPLAYED INFORMATION (SPEED, DISTANCE, FUEL CONSUMPTION, ETC.) SWITCHING | — |
| ● | HAZARD | HAZARD LAMP BLINKED | HAZARD LAMP TURNED OFF (END) | — | — |
| ◆ | SEAT | — | END | FORE-AND-AFT SLIDING ADJUSTMENT | RECLINING ANGLE ADJUSTMENT |
| ● / ◆ | DOOR MIRRORS | WHEN FACING IN LEFTWARD (RIGHTWARD) DIRECTION LEFT BUTTON: UNFOLDED (FOLDED) RIGHT BUTTON: FOLDED (UNFOLDED) AUTOMATICALLY ENDED AFTER OPERATION | — | — | — |
| ● | REAR LIGHTS | LIGHTS TURNED ON | LIGHTS TURNED OFF (END) | — | — |
| ◆ | WINDOWS | OPEN/CLOSE | END | OPEN/CLOSE | — |

FIG. 12
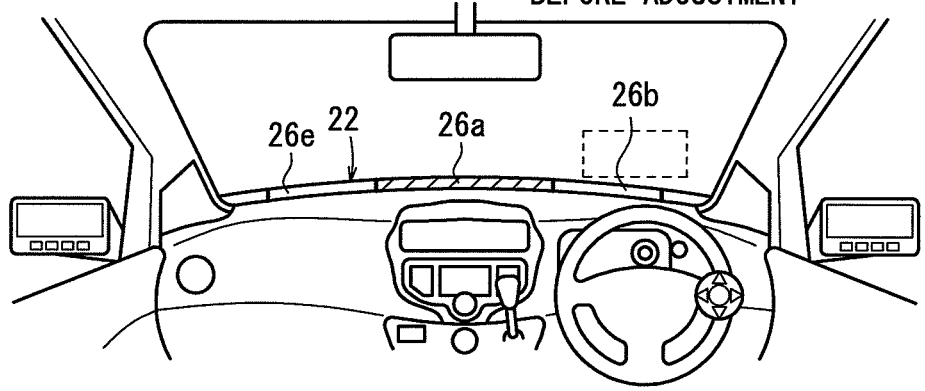
BEFORE ADJUSTMENT
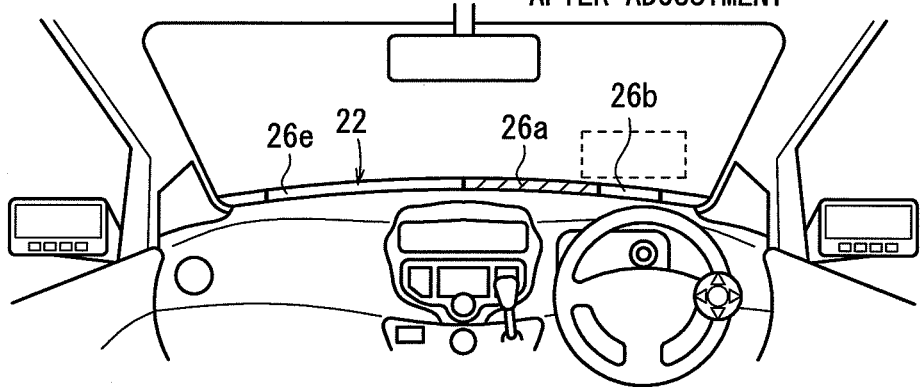
AFTER ADJUSTMENT

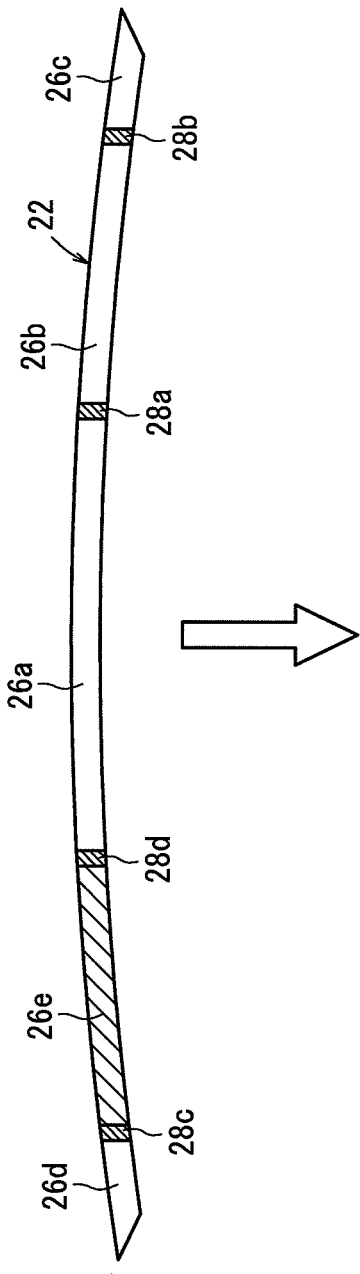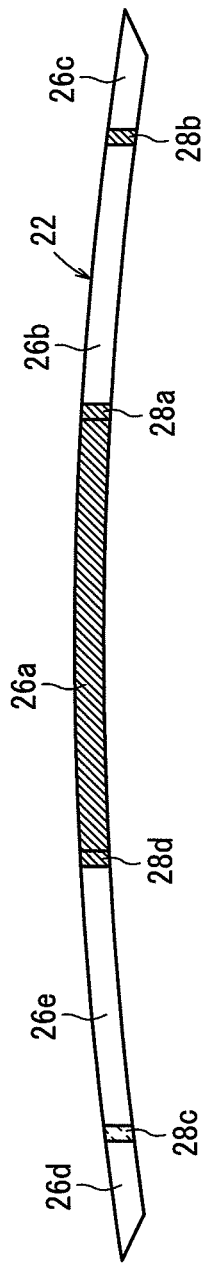
FIG. 14

FIG. 17
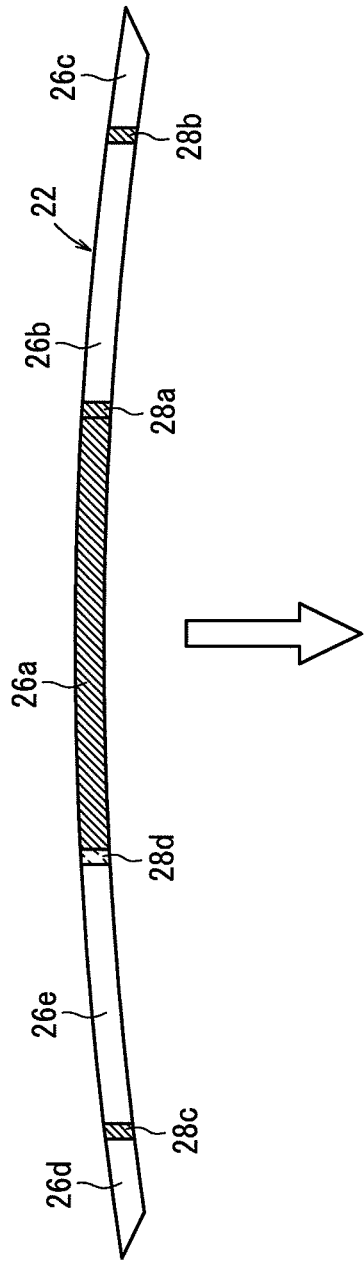
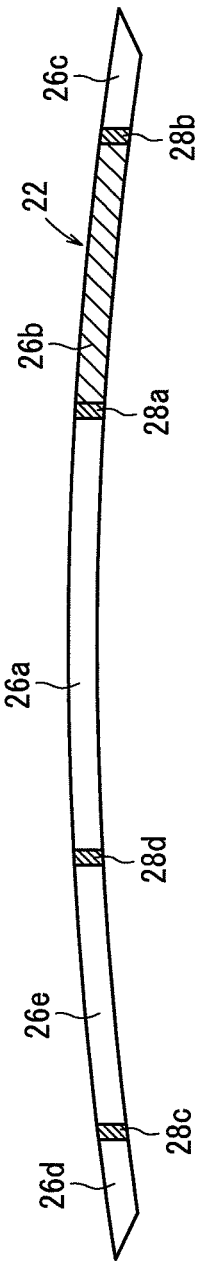

10

WHEN PROPERLY DETECTED

WHEN NOT DETECTED

AUTOMOTIVE INSTRUMENT OPERATING DEVICE AND ALERT DEVICE

TECHNICAL FIELD

The present invention relates to a vehicle-mounted equipment controlling apparatus (automotive instrument operating device) for making a plurality of pieces of vehicle-mounted equipment controllable with the direction of gaze of an occupant of a vehicle, and an indicating apparatus (alert device) for indicating the direction of gaze of the occupant of the vehicle.

BACKGROUND ART

Japanese Laid-Open Patent Publication No. 2010-105417 (hereinafter referred to as "JP2010-105417A") discloses a technology which makes vehicle-mounted equipment 21 gazed at by the driver of a vehicle controllable with a control input unit 28 mounted on a steering wheel 50 (Abstract).

U.S. Patent Application Publication No. 2010/0324779 (hereinafter referred to as "US2010/0324779A1") discloses an apparatus for selecting vehicle-mounted equipment (a side mirror 21, a room mirror 22, a navigation system 23, a vehicle-mounted telephone 24, an air outlet 25, or a meter panel 26) which a vehicle occupant intends to control, with a line L of sight of the vehicle occupant, and controlling the selected vehicle-mounted equipment with a common steering switch 16 (Abstract). According to US2010/0324779A1, the apparatus informs the vehicle occupant of the fact that the vehicle-mounted equipment to which the line L of sight is directed is controllable, through a pilot lamp 21a, 22a, 23a, 24a, 25a, or 26a (Abstract and FIG. 1).

SUMMARY OF INVENTION

According to JP2010-105417A, it is necessary to specify the vehicle-mounted equipment 21 that is gazed at by the driver. If pieces of vehicle-mounted equipment 21, such as an audio device and an air conditioner, are disposed closely to each other, then a judgment error may be made in specifying the pieces of vehicle-mounted equipment 21, tending to fail to keep system reliability. Since highly accurate image processing is required to achieve a desired level of judgment accuracy, it is necessary to employ a high-resolution camera and a high-performance processor, which make the system highly costly.

According to US2010/0324779A1, the vehicle occupant is unable to understand up to which direction the line L of sight should be brought in order to select an intended piece of vehicle-mounted equipment. If the pilot lamp 21a, 22a, 23a, 24a, 25a, or 26a is not turned on even though the driver keeps the line L of sight straight in alignment with the intended piece of vehicle-mounted equipment, then the driver does not know what to do to turn on the pilot lamp 21a, 22a, 23a, 24a, 25a, or 26a.

The present invention has been made in view of the above problems. It is an object of the present invention to provide a vehicle-mounted equipment controlling apparatus which prevents a piece of vehicle-mounted equipment to be controlled from being judged in error, and which is low in cost.

Another object of the present invention is to provide an indicating apparatus which makes a piece of equipment to be controlled easily specifiable based on the direction of gaze and which allows the direction of gaze detected by the apparatus to be recognized by the operator such as a vehicle occupant.

According to the present invention, there is provided a vehicle-mounted equipment controlling apparatus comprising a plurality of pieces of vehicle-mounted equipment mounted on a vehicle and controllable by an occupant of the vehicle, a direction-of-gaze detecting unit for detecting a direction of gaze of the occupant based on a direction of a line of sight or a face direction of the occupant, a vehicle-mounted equipment specifying unit for specifying any one of the pieces of vehicle-mounted equipment based on the direction of gaze detected by the direction-of-gaze detecting unit, and a control unit disposed in a position different from the pieces of vehicle-mounted equipment and controllable by the occupant, wherein the pieces of vehicle-mounted equipment are arrayed in widthwise directions of the vehicle and in vertical directions transverse to the widthwise directions, and divided into a plurality of vehicle-mounted equipment groups respectively in predetermined regions along the widthwise directions of the vehicle, the control unit has a vertical direction selecting unit for selecting the pieces of vehicle-mounted equipment in the vertical directions from the vehicle-mounted equipment group, and the vehicle-mounted equipment specifying unit specifies the vehicle-mounted equipment group based on the direction of gaze detected by the direction-of-gaze detecting unit, and specifies either one of the pieces of vehicle-mounted equipment in the specified vehicle-mounted equipment group based on a vertical direction selected by the vertical direction selecting unit when the vertical direction selecting unit is controlled while the vehicle-mounted equipment group is being specified.

According to the present invention, one of the vehicle-mounted equipment groups is specified based on the direction of gaze of the occupant in the widthwise directions of the vehicle, and a piece of vehicle-mounted equipment in the specified vehicle-mounted equipment group is specified by the occupant controlling the vertical direction selecting unit. Therefore, the occupant does not need to gaze at any one of the pieces of vehicle-mounted equipment to be specified, but may only be required to turn its line of sight or its face toward the vehicle-mounted equipment group (in the widthwise directions of the vehicle) in which a piece of vehicle-mounted equipment to be specified is present. Therefore, it is possible to reduce the number of factors responsible for impairing attention directed forwardly of the vehicle, and also to prevent a target piece of equipment from being determined in error. As it is not necessary to judge whether the occupant gazes at each piece of vehicle-mounted equipment or not, there is no need for a highly accurate line-of-sight/face direction detecting technology. Consequently, the controlling apparatus is prevented from becoming highly costly in its entirety.

The vertical direction selecting unit may comprise individual control switches assigned respectively to the selectable vertical directions. Since the individual control switches are assigned to the selectable vertical directions that represent the pieces of vehicle-mounted equipment belonging to one vehicle-mounted equipment group, it is possible to shorten the period of time required to select a target piece of equipment, and to select a target piece of equipment reliably. Therefore, the controlling apparatus is highly convenient to use.

The vertical direction selecting unit may double as a control input unit for entering a particular control input for the specified piece of vehicle-mounted equipment when the piece of vehicle-mounted equipment is specified by the vehicle-mounted equipment specifying unit. A vertical direction selecting unit, e.g., an equipment selecting switch, and a control input unit, e.g., an equipment controlling switch, may be combined into a common control unit which requires a reduced installation space and which is of a reduced cost. The vertical direction selecting unit also allows blind control actions to be easily entered.

The direction-of-gaze detecting unit may comprise an image capturing unit disposed in a cabin of the vehicle for capturing an image including the occupant and an angle-of-face-direction detecting unit for detecting an angle of the face direction of the occupant in the widthwise directions of the vehicle based on the image captured by the image capturing unit, wherein the direction-of-gaze detecting unit may detect the direction of gaze of the occupant based the angle of the face direction detected by the angle-of-face-direction detecting unit. Inasmuch as the angle of the face direction of the occupant in the widthwise directions of the vehicle may be determined according to an image processing process, the controlling apparatus does not need to have a highly accurate image processing process and devices such as infrared LEDs, etc. for detecting the line of sight based on the detection of bright spots on pupils, and hence is low in cost.

The vertical direction selecting unit may comprise a crisscross switch mounted on a steering wheel of the vehicle, and the selectable vertical directions are assigned to respective vertical directions on the crisscross switch as the steering wheel is viewed in front elevation. Since the crisscross switch allows the occupant to control the pieces of vehicle-mounted equipment without moving its hands off the steering wheel, the occupant finds the controlling apparatus convenient to use. In addition, since the selectable directions are assigned to the vertical positions on the crisscross key, the occupant can select pieces of vehicle-mounted equipment intuitively and can enter blind control actions easily through the crisscross switch.

The vehicle-mounted equipment controlling apparatus may further comprise an indicating unit provided for each of the vehicle-mounted equipment groups, for indicating the vehicle-mounted equipment group specified by the vehicle-mounted equipment specifying unit. The controlling apparatus is thus made lower in cost than if there are indicators assigned respectively to all the pieces of vehicle-mounted equipment, though the controlling apparatus maintains accuracy in specifying the vehicle-mounted equipment group, i.e., preventing the state of the vehicle from deviating from pieces of vehicle-mounted equipment recognized by the occupant.

According to the present invention, there is also provided an indicating apparatus comprising a plurality of pieces of vehicle-mounted equipment mounted on a vehicle and controllable by an occupant of the vehicle, a direction-of-gaze detecting unit for detecting a direction of gaze of the occupant based on a direction of a line of sight or a face direction of the occupant, a vehicle-mounted equipment specifying unit for specifying either one of vehicle-mounted equipment groups of the pieces of vehicle-mounted equipment based on the direction of gaze detected by the direction-of-gaze detecting unit, the pieces of vehicle-mounted equipment being arrayed in widthwise directions of the vehicle and in vertical directions transverse to the widthwise directions, and divided into a plurality of vehicle-mounted equipment groups respectively in predetermined regions along the widthwise directions of the vehicle, and an indicating unit for indicating the vehicle-mounted equipment group specified by the vehicle-mounted equipment specifying unit, wherein the indicating unit have widths equivalent to respective widths of the predetermined regions, and are arrayed along the widthwise directions of the vehicle on an instrument panel of the vehicle.

According to the present invention, one of the vehicle-mounted equipment groups in the widthwise directions of the vehicle which is specified based on the direction of gaze of the occupant is indicated by the indicating unit. The indicating unit has the same widths as the predetermined regions that correspond to the vehicle-mounted equipment groups in the widthwise directions of the vehicle, and is arrayed on the instrument panel along the widthwise directions of the vehicle. Therefore, the occupant is capable of visually recognizing the boundaries and widths of the predetermined regions and of recognizing a specified vehicle-mounted equipment group as it switches from one group to another. It is thus possible for the occupant to easily specify a piece of vehicle-mounted equipment in the widthwise directions of the vehicle by making a minimum change in the line of sight or the face direction.

Even if the direction of gaze intended by the occupant and the direction of gaze detected by the indicating apparatus deviate from each other, the occupant can recognize such a deviation because of the existence of the indicating unit that indicates the detected direction of gaze, and can appropriately adjust the direction of gaze.

If the line of sight or the face direction of the occupant is used only for specifying the vehicle-mounted equipment groups in the widthwise directions of the vehicle, i.e., if a separate selecting device is used to identify vertical directions, then the line of sight or the face direction may be detected only in the widthwise directions of the vehicle. As the line of sight or the face direction does not need to be detected in other directions, e.g., vertical directions, than the widthwise directions of the vehicle, it is possible to simplify the process of detecting the line of sight or the face direction.

The predetermined regions may have boundary lines which are indicated by the indicating unit even when the vehicle-mounted equipment group is not specified by the vehicle-mounted equipment specifying unit. The occupant can thus reliably recognize the boundary lines, and understand to which region the driver should turn the line of sight or the face direction for selecting a particular vehicle-mounted equipment group.

The indicating apparatus may further comprise a control unit disposed in a position different from the pieces of vehicle-mounted equipment and controllable by the occupant, wherein the control unit may have a vertical direction selecting unit for selecting the pieces of vehicle-mounted equipment in the vertical directions from the vehicle-mounted equipment group, the vehicle-mounted equipment specifying unit may specify the vehicle-mounted equipment group based on the direction of gaze detected by the direction-of-gaze detecting unit, and specify either one of the pieces of vehicle-mounted equipment in the specified vehicle-mounted equipment group based on the vertical direction selected by the vertical direction selecting unit while the vehicle-mounted equipment group is being specified, and the indicating unit may change an indicating process depending on the piece of vehicle-mounted equipment specified by the vehicle-mounted equipment specifying unit. The occupant can thus immediately understand which piece of vehicle-mounted equipment is selected in one vehicle-mounted equipment group.

The indicating unit may be capable of adjusting the widths thereof. Consequently, even if the direction of gaze detected by the direction-of-gaze detecting unit and the actual direction of gaze deviate from each other, it is possible to adjust and detect the direction of gaze reasonably in line with the actual direction of gaze.

According to the present invention, there is further provided an indicating apparatus comprising a plurality of pieces of vehicle-mounted equipment mounted on a vehicle along widthwise directions thereof, a direction-of-gaze detector for detecting a direction of gaze of an occupant of the vehicle along the widthwise directions based on at least one of a direction of a line of sight or a face direction of the occupant, a vehicle-mounted equipment specifier for specifying at least one of the pieces of vehicle-mounted equipment which corresponds to the direction of gaze, and an indicating device for visually indicating one of a plurality of gazing regions which corresponds to the detected direction of gaze or the at least one of the specified pieces of vehicle-mounted equipment, the gazing regions being established within a range in which the direction of gaze can be detected and being established depending on the pieces of vehicle-mounted equipment along the widthwise directions of the vehicle, wherein the indicating device comprises a plurality of indicators indicating boundaries between adjacent ones of the gazing regions, the indicators being arranged continuously or interruptedly along the widthwise directions of the vehicle respectively in the gazing regions on a lower portion or an upper portion of a front windshield of the vehicle or a peripheral area of the lower portion or the upper portion of the front windshield.

According to the present embodiment, the controlling apparatus includes the indicators for visually indicating the gazing regions that correspond to detected directions of gaze or at least one piece of specified vehicle-mounted equipment. The indicators are successively arranged along the widthwise directions of the vehicle in association with the respective gazing regions in the lower portion or the upper portion of the front windshield or the periphery thereof, indicating the boundaries between the adjacent gazing regions. The occupant is thus capable of visually recognizing the boundaries and widths of the gazing regions, and recognizing a selected one of the gazing regions as it switches from one region to another. It is thus possible for the occupant to reliably specify a piece of vehicle-mounted equipment in the widthwise directions of the vehicle by making a minimum change in the line of sight or the face direction.

Even if the direction of gaze intended by the occupant and the direction of gaze detected by the indicating apparatus deviate from each other, it is possible for the occupant to recognize such a deviation because of the existence of the indicators that visually indicate the detected direction of gaze, and to appropriately adjust the direction of gaze.

If the line of sight or the face direction of the occupant is used only for specifying at least one piece of vehicle-mounted equipment in the widthwise directions of the vehicle, i.e., if a separate selecting device is used to identify vertical directions, then the line of sight or the face direction may be detected only in the widthwise directions of the vehicle. As the line of sight or the face direction does not need to be detected in other directions, e.g., vertical directions, than the widthwise directions of the vehicle, it is possible to simplify the process of detecting the line of sight or the face direction.

BRIEF DESCRIPTION OF DRAWINGS

FIG. 6C is a view showing a third mode of operation carried out by the driver of the vehicle for changing the volume of the audio device;

FIG. 7B is a view showing a second mode of operation carried out by the driver of the vehicle for displaying the HUD and confirming a vehicle speed and a fuel consumption;

FIG. 9 is a diagram showing a list of processes of selecting and controlling pieces of vehicle-mounted equipment;

FIG. 10 is a diagram showing a list of functions assigned to buttons;

FIG. 12 is a view showing the boundary lines before and after they are adjusted;

FIG. 14 is a view showing by way of example how a display device changes in state from the time before the boundary lines start to be adjusted to the time when the boundary lines start to be adjusted;

FIG. 17 is a view showing by way of example how the display device changes in state from the time when the boundary lines are being adjusted to the time when the adjustment of the boundary lines is ended;

DESCRIPTION OF EMBODIMENTS

1. Explanation of Overall Arrangement

[1-1. Overall Arrangement]

Figure 1:
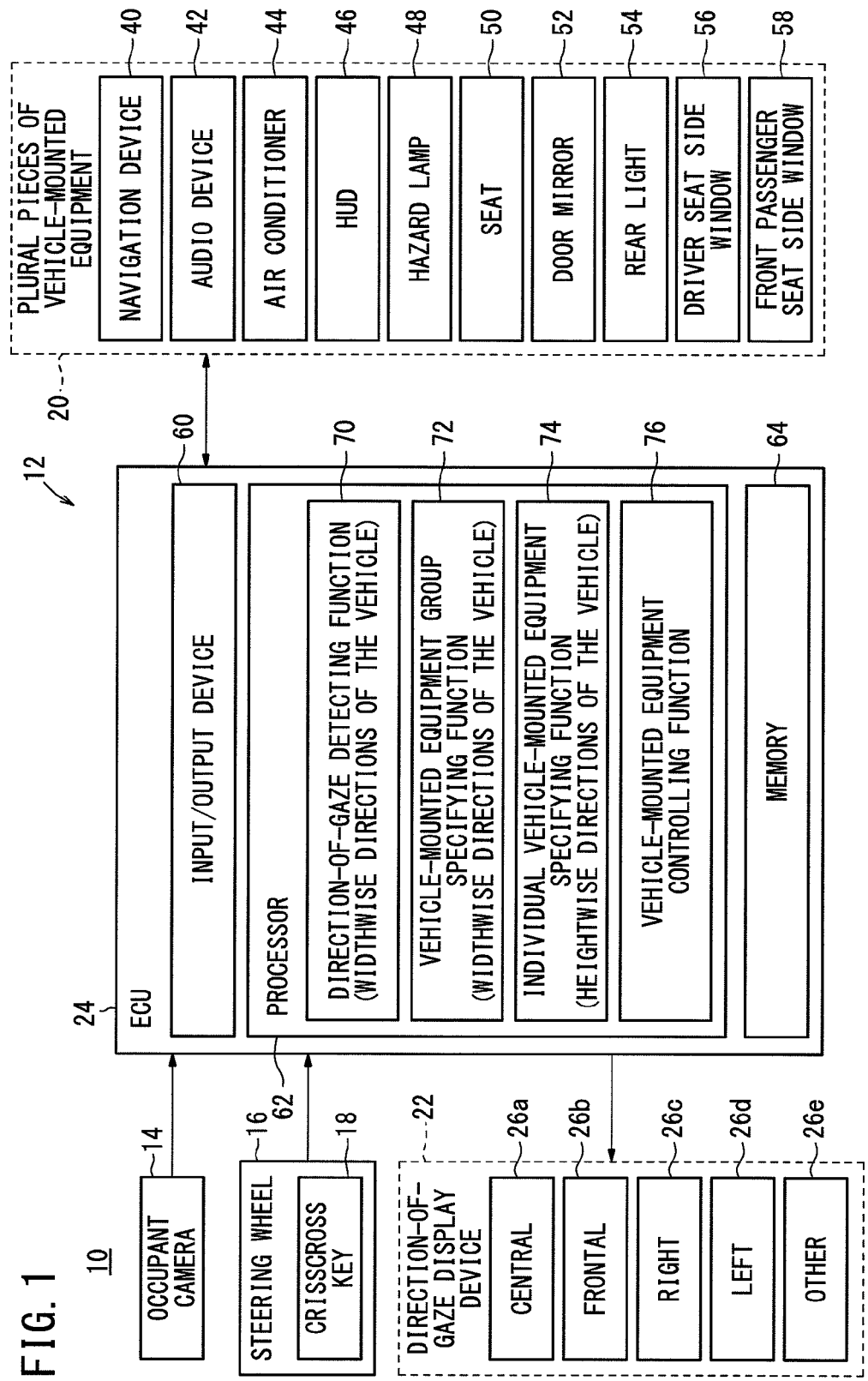
FIG. 1 is a block diagram of a vehicle incorporating a vehicle-mounted equipment controlling apparatus (informing apparatus) according to an embodiment of the present invention.
Figure 2:
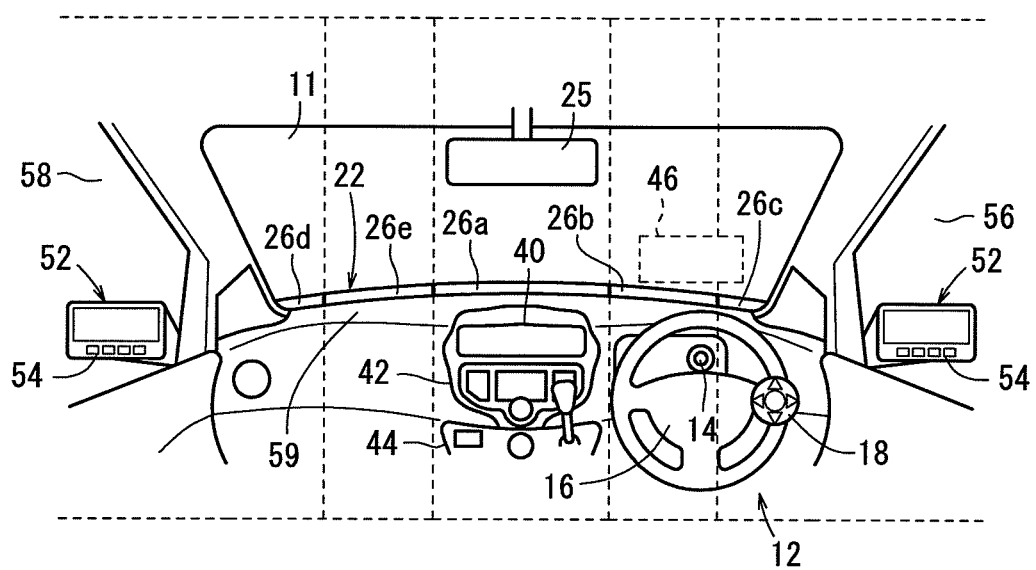
FIG. 2 is a view showing a peripheral area of the front windshield of the vehicle.

FIG. 1 is a block diagram of a vehicle 10 incorporating a vehicle-mounted equipment controlling apparatus 12 (hereinafter referred to as "controlling apparatus 12") according to an embodiment of the present invention. FIG. 2 is a view showing a peripheral area of a front windshield 11 of the vehicle 10. As shown in FIGS. 1 and 2, the controlling apparatus 12 includes an occupant camera 14, a crisscross key 18 mounted on a steering wheel 16, a plurality of pieces 20 of vehicle-mounted equipment, a direction-of-gaze display device 22 (hereinafter referred to as "display device 22"), and an electronic control unit (hereinafter referred to as "ECU 24"). As shown in FIG. 2, the vehicle 10 according to the present embodiment is a so-called right-hand drive vehicle. However, the controlling apparatus 12 may be incorporated in a left-hand drive vehicle.

[1-2. Occupant Camera 14]

As shown in FIG. 2, the occupant camera 14 is disposed on a steering column, not shown, in front of the driver, for acquiring an image of the face of the driver (hereinafter referred to as "face image"). However, the occupant camera 14 is not positionally limited to the position mentioned above, but may be disposed in the periphery of a rear-view mirror 25 (FIG. 2). The occupant camera 14 is not limited to a camera that captures images in a single direction, but may be a camera that captures images in a plurality of directions (so-called stereo camera).

[1-3. Crisscross Key 18]

Figure 3:
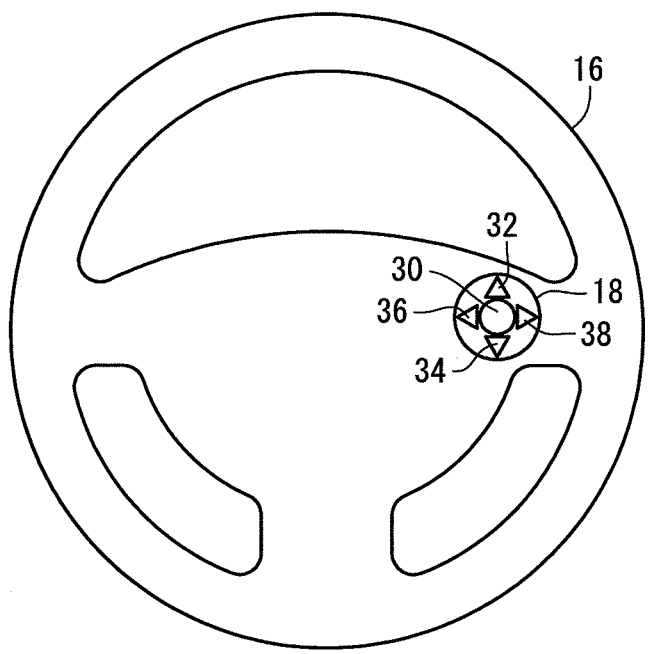
FIG. 3 is a front view of the steering wheel of the vehicle.

The driver can specify a piece 20 of vehicle-mounted equipment to be controlled (hereinafter referred to as "target piece of equipment") and enter a control input for the specified piece 20 of vehicle-mounted equipment, using the crisscross key 18. As shown in FIG. 3, the crisscross key 18 has a central button 30, an upper button 32, a lower button 34, a left button 36, and a right button 38. In FIG. 2, the crisscross key 18 is shown at an enlarged scale. A process of controlling the crisscross key 18 will be described later.

[1-4. Plural Pieces 20 of Vehicle-Mounted Equipment]

According to the present embodiment, the plural pieces 20 (FIG. 1) of vehicle-mounted equipment include a navigation device 40, an audio device 42, an air conditioner 44, a head-up display 46 (hereinafter referred to as "HUD 46"), a hazard lamp 48, a driver seat 50, a pair of door mirrors 52, a pair of rear lights 54, a driver seat side window 56, and a front passenger seat side window 58.

Figure 4:
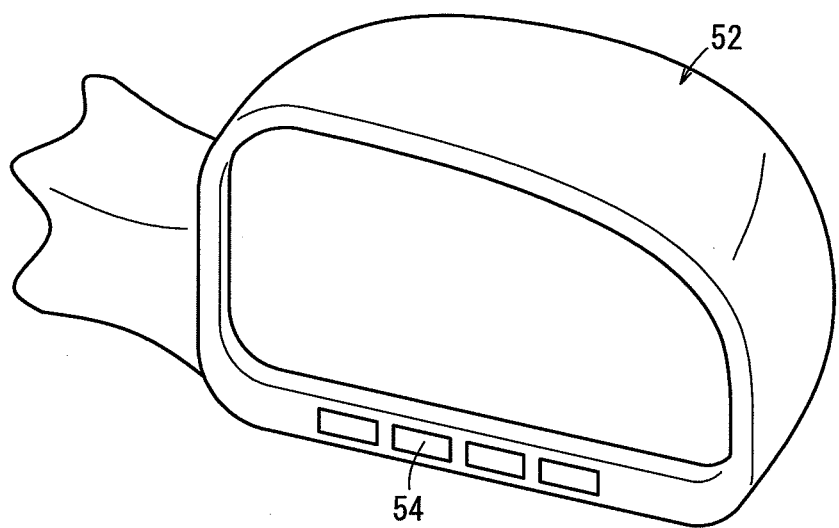
FIG. 4 is a perspective view of a door mirror of the vehicle.

As shown in FIG. 4, each of the rear lights 54 comprises light-emitting diodes (LEDs) disposed on a lower portion of the door mirror 52 for illuminating a rear side region of the vehicle 10.

[1-5. Direction-of-Gaze Display Device 22]

As shown in FIG. 2, the display device 22 is mounted on an instrument panel 59 in the periphery of a lower portion of the front windshield 11. As described later, the display device 22 may be disposed in another position. The display device 22 has a plurality of direction-of-gaze indicators 26a through 26e (hereinafter also referred to as "indicators 26") for indicating the direction of gaze of the driver (occupant) across the widthwise directions of the vehicle 10. Each of the indicators 26a through 26e comprises an illuminating unit such as a light-emitting diode (LED) or the like. Alternatively, the HUD 46 may be disposed in a position corresponding to the display device 22 so as to serve as the indicators 26a through 26e. The indicators 26a through 26e are capable of displaying a plurality of colors, e.g., blue, green, yellow, and red, though they may display a single color.

In the present embodiment, any one of the indicators 26a through 26e which is aligned with the direction of gaze of the driver is turned on, whereas the other indicators 26a through 26e are turned off. Therefore, the driver can recognize the direction of gaze that is detected by the controlling apparatus 12.

The display device 22 also includes boundary lines 28a through 28d (hereinafter also referred to as "boundary lines 28") (see FIG. 14) disposed between adjacent ones of the indicators 26a through 26e. In the present embodiment, each of the boundary lines 28a through 28d comprises an illuminating unit such as a LED, as is the case with the indicators 26a through 26e. Stated otherwise, the display device 22 comprises an array of illuminating units such as LEDs that are selectively used as the indicators 26a through 26e and the boundary lines 28a through 28d. The boundary lines 28a through 28d may not emit light, or the display device 22 may not include any boundary lines 28a through 28d.

[1-6. ECU 24]

The ECU 24 serves to control the vehicle-mounted equipment controlling apparatus 12 (in the present embodiment, each of the pieces 20 of vehicle-mounted equipment). As shown in FIG. 1, the ECU 24 includes an input/output device 60, a processor 62, and a memory 64. The processor 62 has a direction-of-gaze detecting function 70, a vehicle-mounted equipment group specifying function 72, an individual vehicle-mounted equipment specifying function 74, and a vehicle-mounted equipment controlling function 76.

According to the present embodiment, the above functions 70, 72, 74, 76 are used to control the pieces 20 of vehicle-mounted equipment. Specifically, when the driver turns its line of sight or its face toward a piece 20 of vehicle-mounted equipment to be controlled (hereinafter referred to as "target piece of equipment") along the widthwise directions of the vehicle, and operates the crisscross key 18, the driver can control the target piece of equipment. As described later, a target piece of equipment can be specified and controlled according to another process.

The direction-of-gaze detecting function 70 is a function to detect the direction of gaze of the driver based on at least one of the direction of the face of the driver (occupant) and the direction of the line of sight of the driver (the direction of the eyeballs). The vehicle-mounted equipment group specifying function 72 is a function to specify one of vehicle-mounted equipment groups (groups A through D) that exists in the direction of gaze detected by the direction-of-gaze detecting function 70. The individual vehicle-mounted equipment specifying function 74 is a function to specify a target piece of vehicle-mounted equipment based on a control action made by the driver from among a plurality of pieces 20 of vehicle-mounted equipment that are included in the vehicle-mounted equipment group specified by the vehicle-mounted equipment group specifying function 72. The vehicle-mounted equipment controlling function 76 is a function to control the target piece of vehicle-mounted equipment specified by the individual vehicle-mounted equipment specifying function 74 depending on a control input entered by the driver.

2. Outline of Control According to the Present Embodiment

According to the present embodiment, as described above, when the driver turns its line of sight or its face toward a target piece of vehicle-mounted equipment along the widthwise directions of the vehicle, and operates the crisscross key 18, the driver can control the target piece of equipment.

In order to perform such a control process, according to the present embodiment, the direction of the face of the driver and the direction of the line of sight of the driver are detected based on the face image of the driver which is captured by the occupant camera 14, and the direction of gaze of the driver across the widthwise directions of the vehicle is judged based on the detected direction of the face and the detected direction of the line of sight. Thereafter, based on a control action made on the crisscross key 18, a heightwise direction (vertical direction) is specified. In this manner, the target piece of vehicle-mounted equipment is specified.

Figure 5:
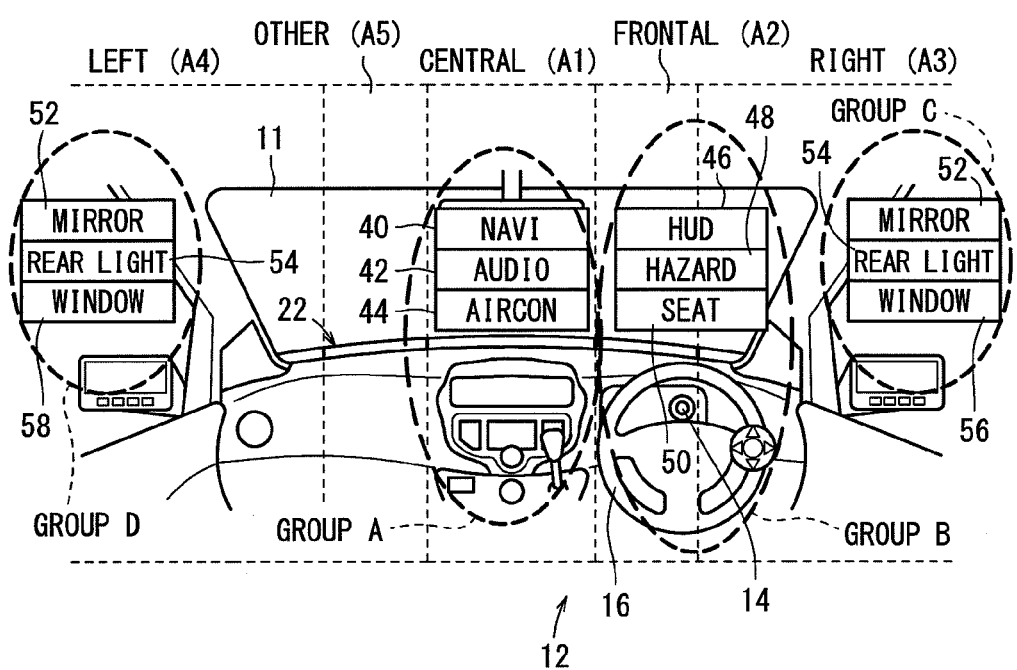
FIG. 5 is a view showing five regions into which the peripheral area of the front windshield is divided.

According to the present embodiment, the direction of gaze of the driver across the widthwise directions of the vehicle is one of five directions shown in FIG. 5. Specifically, a peripheral area of the front windshield 11 is divided into five regions A1 through A5, i.e., a central region A1, a front region A2, a right region A3, a left region A4, and a remaining region A5. The pieces 20 of vehicle-mounted equipment are assigned to these five regions (groups A through D).

The navigation device 40, the audio device 42, and the air conditioner 44 (group A) are assigned to the central region A1. In FIG. 5 and other figures, "NAVI" stands for "navigation device", "AUDIO" for "audio device", and "AIRCON" for "air conditioner".

The HUD 46, the hazard lamp 48, and the seat 50 (group B) are assigned to the front region A2. In FIG. 5 and other figures, "HAZARD" stands for "hazard lamp". The door mirror 52, the rear light 54, and the driver seat side window 56 (group C) are assigned to the right region A3. The door mirror 52, the rear light 54, and the front passenger seat side window 58 (group D) are assigned to the left region A4. No vehicle-mounted equipment is assigned to the remaining region A5. In the present embodiments, the left and right door mirrors 52 are simultaneously unfolded and simultaneously folded. The left and right rear lights 54 are simultaneously controlled.

The ECU 24 (the direction-of-gaze detecting function 70) detects the face direction of the driver and the direction of the line of sight of the driver (the relative positions of the eyeballs) based on the face image from the occupant camera 14, and judges the direction of gaze of the driver based on the detected face direction and the detected direction of the line of sight. The ECU 24 may judge the direction of gaze of the driver based on one of the detected face direction and the detected direction of the line of sight. Based on the judged direction of gaze, the ECU 24 (the vehicle-mounted equipment group specifying function 72) specifies one of the vehicle-mounted equipment groups (groups A through D). Then, the ECU 24 specifies a target piece of vehicle-mounted equipment depending on a depressed button (any one of the buttons 30, 32, 34, 36, 38) of the crisscross key 18. Thereafter, the ECU 24 controls the target piece of vehicle-mounted equipment depending on a control action on the crisscross key 18.

3. Process of Selecting a Target Piece of Vehicle-Mounted Equipment and Modes of Operation Thereof According to the Present Embodiment

[3-1. When the Volume of the Audio Device 42 is to be Changed]

Figure 6A:
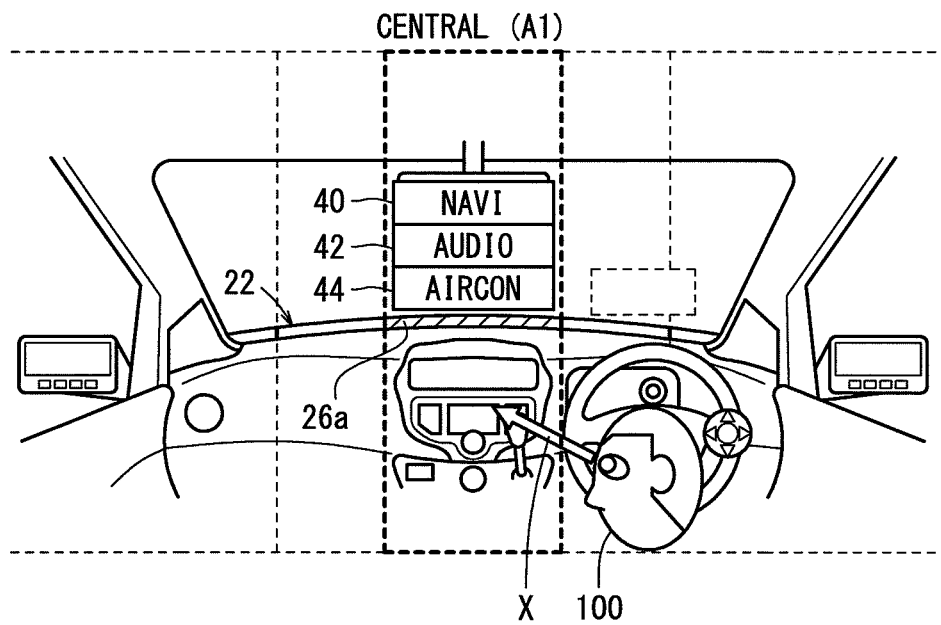
FIG. 6A is a view showing a first mode of operation carried out by the driver of the vehicle for changing the volume of an audio device.
Figure 6B:
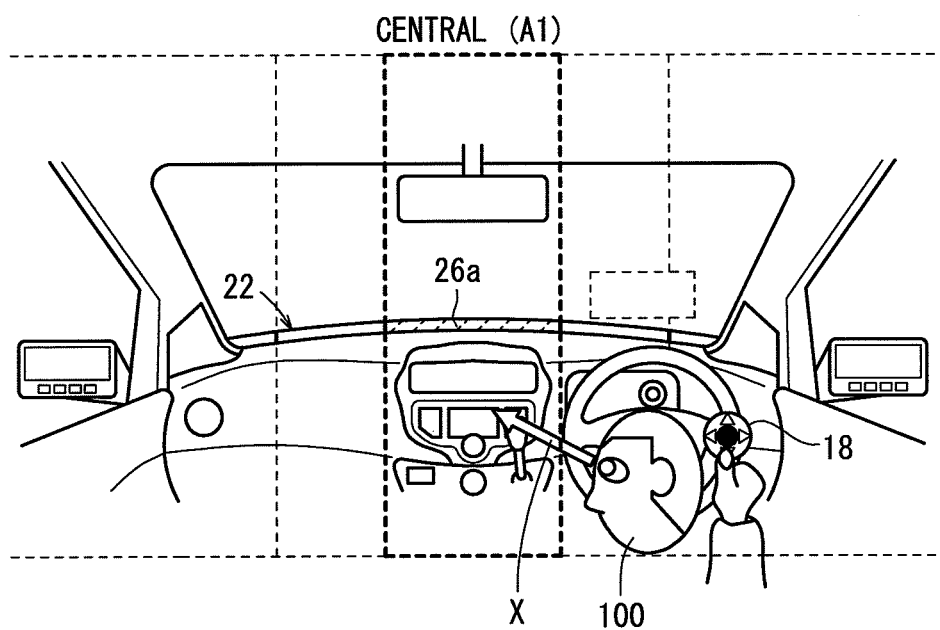
FIG. 6B is a view showing a second mode of operation carried out by the driver of the vehicle for changing the volume of the audio device.

FIGS. 6A through 6C show first through third modes of operation carried out by a driver 100 for changing the volume of the audio device 42. First, as shown in FIG. 6A, the driver 100 looks at or turns its face to the region A1 (central direction) where the audio device 42 is present. The ECU 24 now specifies a vehicle-mounted equipment group (group A) according to a direction-of-gaze judging technology to be described later. In FIG. 6A and other figures, the arrow X represents the direction of gaze of the driver 100. The ECU 24 turns on the indicator 26a that corresponds to the judged direction X of gaze {or the specified vehicle-mounted equipment group (group A)}. If the direction X of gaze changes at this stage, then the indicators 26a through 26e also change in its turned-on state, and are turned on to emit light in a color (e.g., green) indicating that no target piece of vehicle-mounted equipment is specified.

As shown in FIG. 6B, the driver 100 presses the crisscross key 18 based on the positional relationship between pieces 20 of vehicle-mounted equipment (the navigation device 40, the audio device 42, and the air conditioner 44 from above), determining a target piece of vehicle-mounted equipment. Specifically, since the button of the crisscross key 18 which corresponds to the audio device 42 is the central button 30, the driver 100 presses the central button 30. When the driver 100 presses the central button 30, the group A is selected, and the central indicator 26a is continuously turned on regardless of the subsequence direction X of gaze. The color of the indicator 26a changes depending on the selected target piece of vehicle-mounted equipment. For example, the indicator 26a emits light in blue, i.e., displays blue, when the navigation device 40 is selected, yellow when the audio device 42 is selected, and red when the air conditioner 44 is selected. Therefore, when the audio device 42 is selected, the indicator 26a displays yellow.

As shown in FIG. 6C, the driver 100 operates the crisscross key 18 to adjust the volume of the audio device 42. Specifically, each time the driver 100 presses the upper button 32, the volume level is incremented by 1, and each the driver 100 presses the lower button 34, the volume level is decremented by 1. At this time, the driver 100 does not need to see the target region, i.e., the central region A1 corresponding to the group A, or the target piece 20 of vehicle-mounted equipment, i.e., the audio device 42, but can control the target piece 20 of vehicle-mounted equipment, i.e., the audio device 42, while seeing even in the forward direction. While the driver 100 is controlling the audio device 42, the indicator 26a corresponding to the audio device 42 is continuously turned on in the color (yellow) corresponding to the audio device 42. For finishing the controlling of the audio device 42, the driver 100 presses the central button 30. When the controlling of the audio device 42 is finished, any one of the indicators 26a through 26e which corresponds to a newly detected direction X of gaze is turned on to emit light in green, which is the color indicating that no target piece of vehicle-mounted equipment is specified.

[3-2. When the HUD 46 is to be Displayed for Confirming a Vehicle Speed and a Fuel Consumption]

Figure 7A:
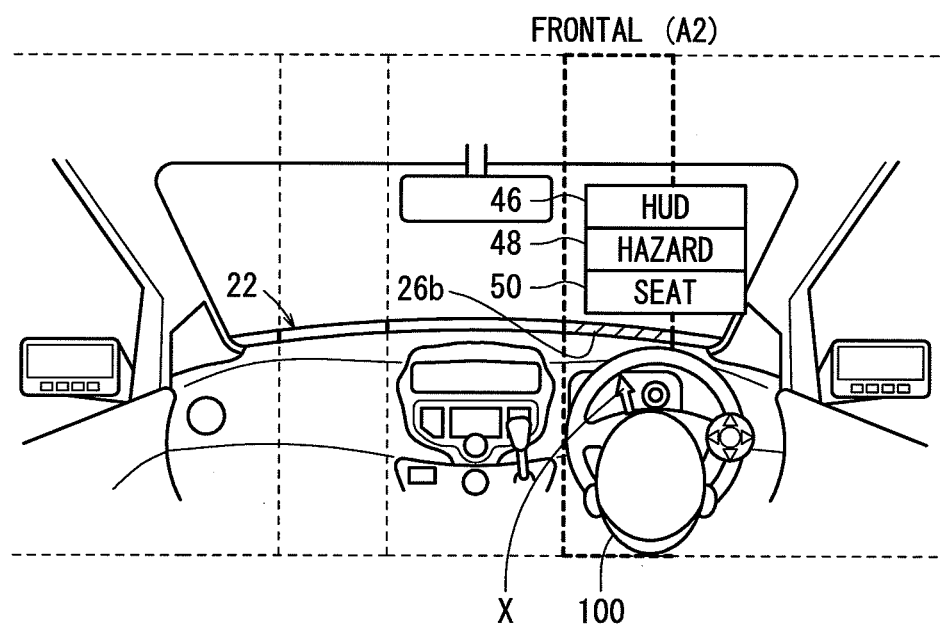
FIG. 7A is a view showing a first mode of operation carried out by the driver of the vehicle for displaying a head-up display (HUD) and confirming a vehicle speed and a fuel consumption.
Figure 7C:
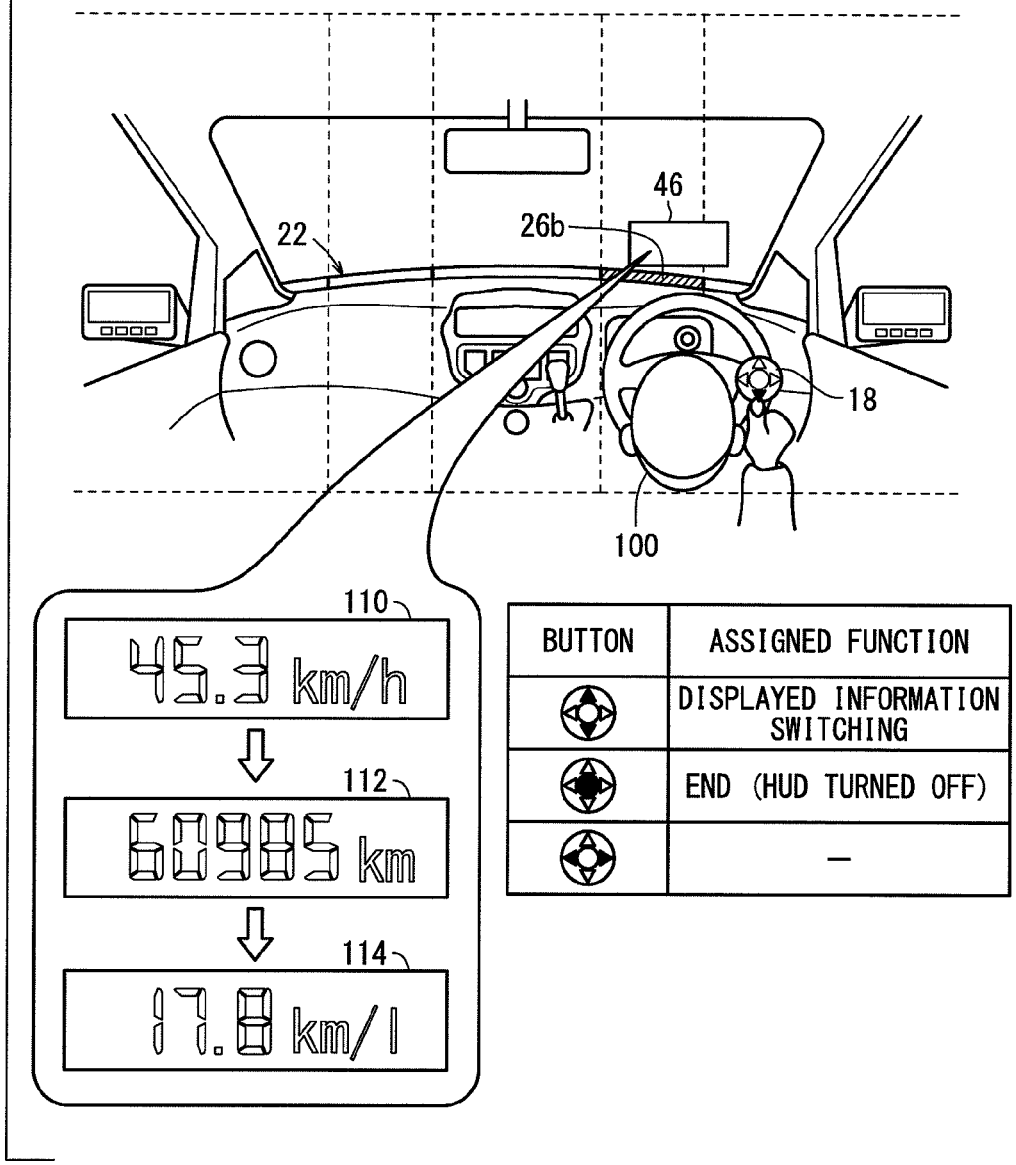
FIG. 7C is a view showing a third mode of operation carried out by the driver of the vehicle for displaying the HUD and confirming a vehicle speed and a fuel consumption.

FIGS. 7A through 7C show first through third modes of operation carried out by the driver 100 for displaying the HUD 46 for confirming a vehicle speed and a fuel consumption. As shown in FIG. 7A, the driver 100 sees or turns its face toward the region A2 (frontal direction) where the HUD 46 is present, among the five regions A1 through A5. The ECU 24 now specifies the vehicle-mounted equipment group B (group B) according to the direction-of-gaze judging technology. The ECU 24 turns on the indicator 26b corresponding to the judged direction X of gaze {or the specified vehicle-mounted equipment group B (group B)} to emit light in green, i.e., the color indicating that no target piece of vehicle-mounted equipment is specified.

As shown in FIG. 7B, the driver 100 presses the crisscross key 18 based on the positional relationship between pieces 20 of vehicle-mounted equipment (the HUD 46, the hazard lamp 48, and the seat 50 from above), determining a target piece of vehicle-mounted equipment. Specifically, since the button of the crisscross key 18 which corresponds to the HUD 46 is the upper button 32, the driver 100 presses the upper button 32. When the driver 100 presses the upper button 32, the frontal indicator 26b is continuously turned on regardless of the subsequence direction X of gaze. The indicator 26b now displays a color corresponding to the selected target piece 20 of vehicle-mounted equipment. For example, the indicator 26b displays blue when the HUD 46 is selected, yellow when the hazard lamp 48 is selected, and red when the seat 50 is selected. Therefore, when the HUD 46 is selected, the indicator 26b displays blue.

As shown in FIG. 7C, the driver 100 operates the crisscross key 18 to change displayed information on the HUD 46. Specifically, each time the driver 100 presses the upper button 32, the displayed information on the HUD 46 changes from one item to another according to a sequence of a vehicle speed 110 to a traveled distance 112 to a fuel consumption 114 to the vehicle speed 110, and each time the driver 100 presses the lower button 34, the displayed information on the HUD 46 changes from one item to another according to a sequence of the vehicle speed 110 to the fuel consumption 114 to the traveled distance 112 to the vehicle speed 110. The HUD 46 may display other items of information, e.g., an amount of gasoline, a remaining stored battery energy level, and a distance that the vehicle 10 can travel, other than the vehicle speed 110, the traveled distance 112, and the fuel consumption 114. At this time, the driver 100 does not need to see the target region, i.e., the front region A2 corresponding to the group B, or the target piece 20 of vehicle-mounted equipment, i.e., the HUD 46, but can control the HUD 46 while seeing even in the forward direction.

While the driver 100 is controlling the HUD 46, the indicator 26b corresponding to the HUD 46 is continuously turned on in the color (blue) corresponding to the HUD 46. For finishing the controlling of the HUD 46, the driver 100 presses the central button 30. When the controlling of the HUD 46 is finished, any one of the indicators 26a through 26e which corresponds to a newly detected direction X of gaze is turned on to emit light in green, which is the color indicating that no target piece of vehicle-mounted equipment is specified.

[3-3. When the Front Passenger Seat Side Window 58 is to be Opened and Closed]

Figure 8A:
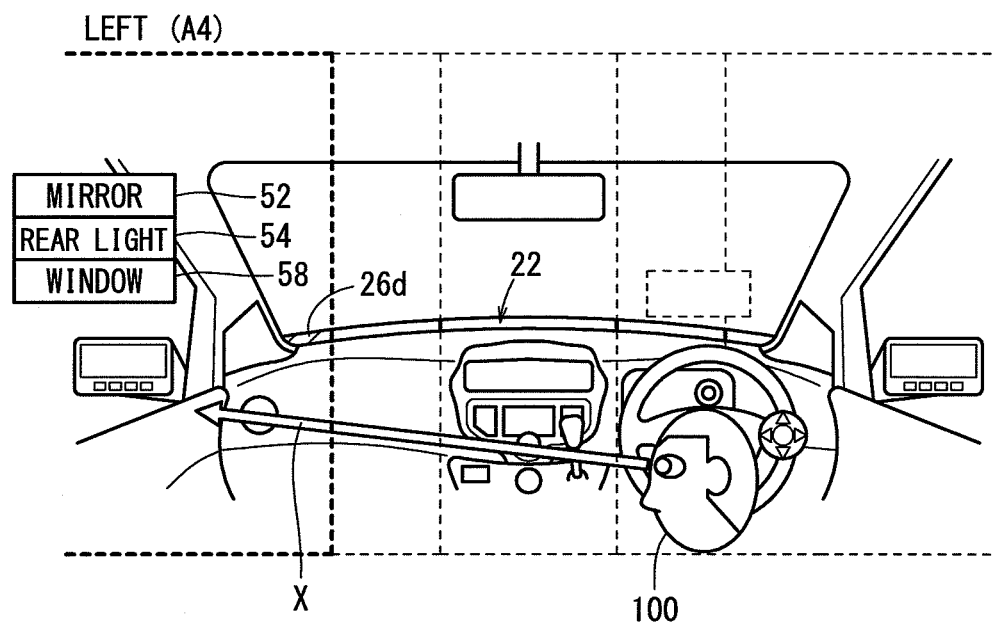
FIG. 8A is a view showing a first mode of operation carried out by the driver of the vehicle for opening and closing a front passenger seat side window of the vehicle.
Figure 8B:
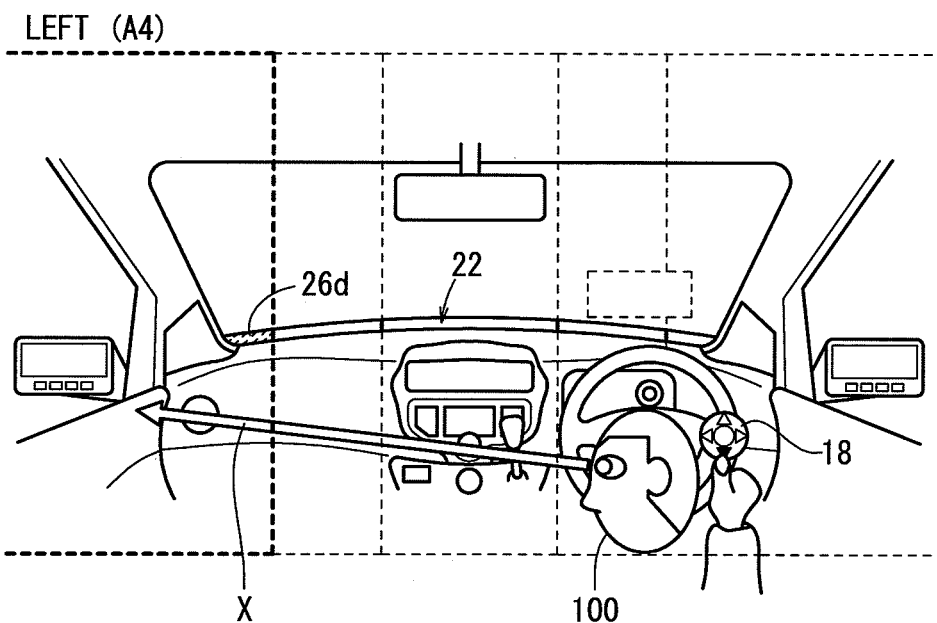
FIG. 8B is a view showing a second mode of operation carried out by the driver of the vehicle for opening and closing the front passenger seat side window of the vehicle.
Figure 8C:
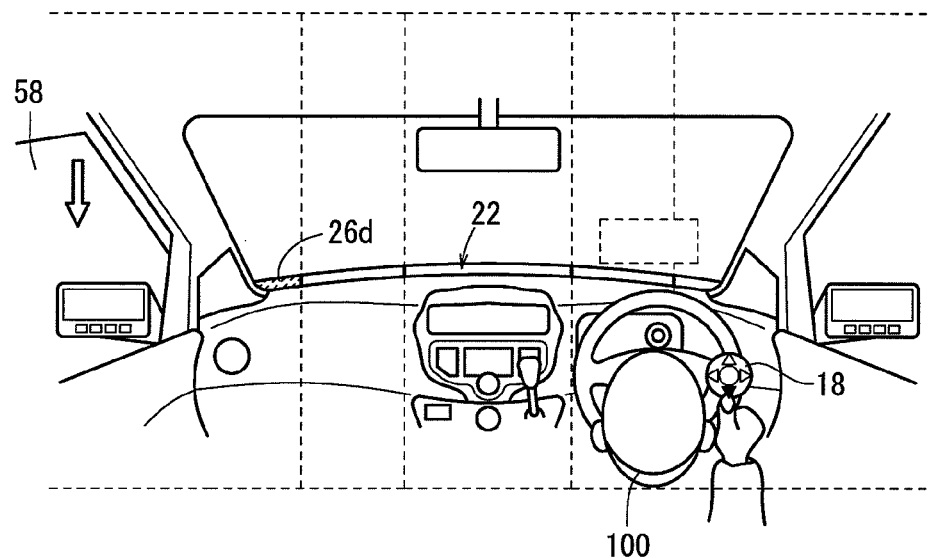
FIG. 8C is a view showing a third mode of operation carried out by the driver of the vehicle for opening and closing the front passenger seat side window of the vehicle.

FIGS. 8A through 8C show first through third modes of operation carried out by the driver 100 for opening and closing the front passenger seat side window 58. As shown in FIG. 8A, the driver 100 sees or turns its face toward the region A4 (left direction) where the front passenger seat side window 58 is present, among the five regions A1 through A5. The ECU 24 now specifies the vehicle-mounted equipment group D (group D) according to the direction-of-gaze judging technology. The ECU 24 turns on the indicator 26d corresponding to the judged direction X of gaze {or the specified vehicle-mounted equipment group D (group D)} to emit light in green, i.e., the color indicating that no target piece of vehicle-mounted equipment is specified.

As shown in FIG. 8B, the driver 100 presses the crisscross key 18 based on the positional relationship between pieces 20 of vehicle-mounted equipment (the door mirrors 52, the rear lights 54, and the front passenger seat side window 58 from above), determining a target piece of vehicle-mounted equipment. Specifically, since the buttons of the crisscross key 18 which correspond to the front passenger seat side window 58 are the upper button 32 and the lower buttons 34, the driver 100 presses the upper button 32 or the lower button 34. When the driver 100 presses the upper button 32 or the lower button 34, the frontal indicator 26d is continuously turned on regardless of the subsequence direction X of gaze. The indicator 26d now displays a color corresponding to the selected target piece 20 of vehicle-mounted equipment. For example, the indicator 26d displays blue when the door mirrors 52 are selected, yellow when the rear lights 54 are selected, and red when the front passenger seat side window 58 is selected. Therefore, when the front passenger seat side window 58 is selected, the indicator 26d displays red.

The door mirrors 52 and the rear lights 54 are set in vertically related positions, whereas the front passenger seat side window 58 may be vertically related reversibly to the door mirrors 52 and the rear lights 54 depending on where the front passenger seat side window 58 sets its reference position. In this embodiment, the front passenger seat side window 58 has its reference position set at an actuator thereof, not shown. However, the front passenger seat side window 58 may have its reference position set in another place. Accordingly, the door mirrors 52, the rear lights 54, and the front passenger seat side window 58 may be associated with different buttons of the crisscross key 18. However, since the door mirrors 52 are unfolded and folded usually substantially horizontally whereas the front passenger seat side window 58 is opened and closed substantially vertically, if their directions of movement are to be taken into account, then the left button 36 and the right button 38 should be assigned to the door mirrors 52 and the upper button 32 and the lower button 34 should be assigned to the front passenger seat side window 58 for controlling the door mirrors 52 and the front passenger seat side window 58 more intuitively.

As shown in FIG. 8C, the driver 100 operates the crisscross key 18 to open and close the front passenger seat side window 58. Specifically, each time the driver 100 presses the lower button 34, the front passenger seat side window 58 is opened, and each time the driver 100 presses the upper button 32, the front passenger seat side window 58 is closed. At this time, the driver 100 does not need to see the target piece 20 of vehicle-mounted equipment, i.e., the front passenger seat side window 58, but can control the target piece 20 of vehicle-mounted equipment, i.e., the front passenger seat side window 58, while seeing even in the forward direction.

While the driver 100 is controlling the front passenger seat side window 58, the indicator 26d corresponding to the front passenger seat side window 58 is continuously turned on in the color red) corresponding to the front passenger seat side window 58. For finishing the controlling of the front passenger seat side window 58, the driver 100 presses the central button 30. When the controlling of the front passenger seat side window 58 is finished, any one of the indicators 26a through 26e which corresponds to a newly detected direction X of gaze is turned on to emit light in green, which is the color indicating that no target piece of vehicle-mounted equipment is specified.

4. Summary of Processes of Selecting and Controlling Pieces 20 of Vehicle-Mounted Equipment FIG. 9 is a diagram showing a list of processes of selecting and controlling pieces 20 of vehicle-mounted equipment, and FIG. 10 is a diagram showing a list of functions assigned to buttons. The driver 100 can easily control a target piece of vehicle-mounted equipment by operating the buttons of the crisscross key 18 as shown in FIGS. 9 and 10.

5. Specific Flowcharts

[5-1. Overall Flow]

Figure 11:
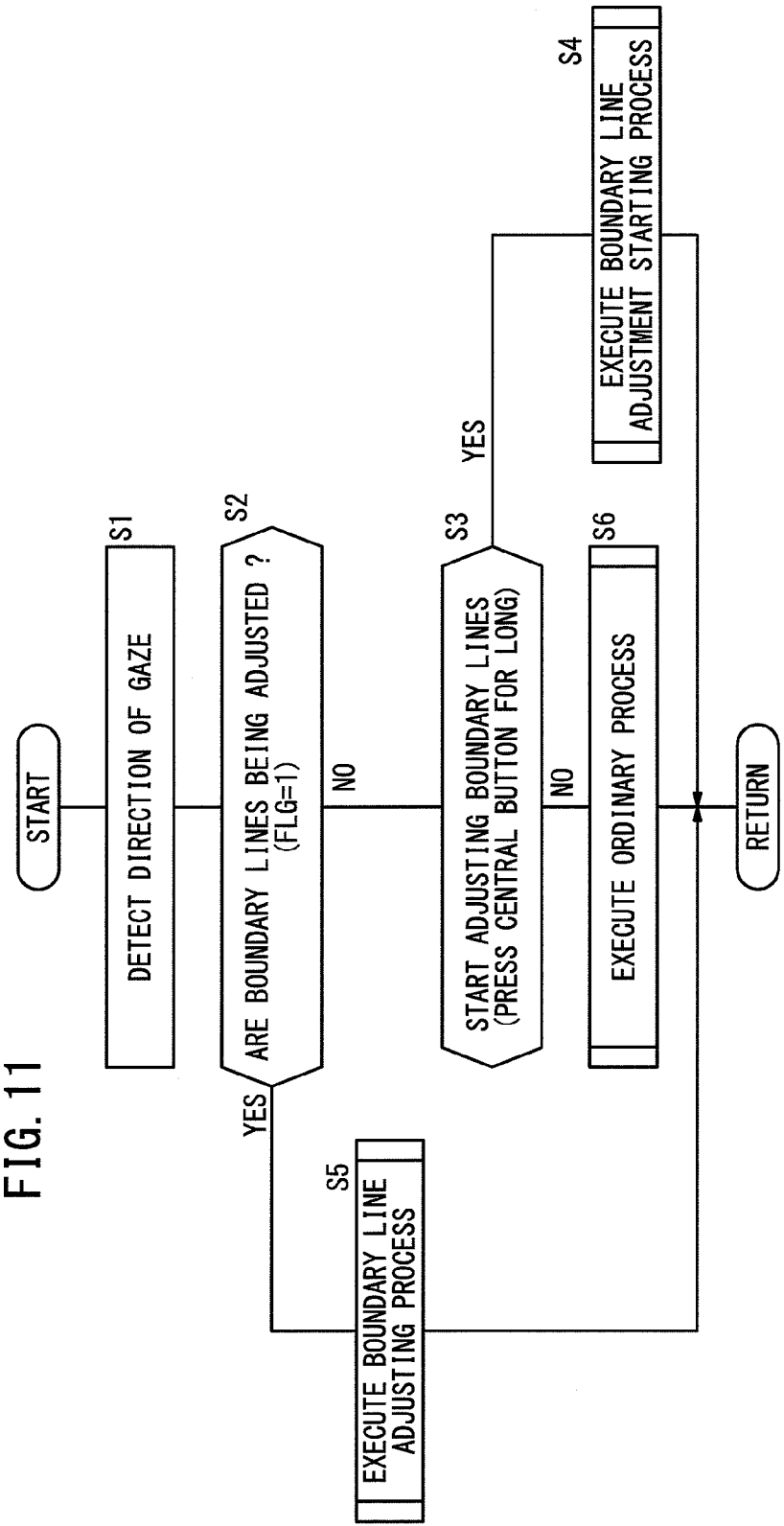
FIG. 11 is a flowchart of an operation sequence for adjusting the boundary lines between indicators and selecting or controlling each piece of vehicle-mounted equipment.

FIG. 11 is a flowchart of an operation sequence for adjusting the boundary lines 28a through 28d between the indicators 26a through 26e and selecting or controlling each piece 20 of vehicle-mounted equipment. In step S1, the ECU 24 detects the direction X of gaze of the driver 100 based on the face image of the driver 100 that is acquired by the occupant camera 14.

In step S2, the ECU 24 judges whether the boundary lines 28a through 28d between the indicators 26a through 26e are being adjusted or not. Specifically, the ECU 24 judges whether a flag FLG indicating whether the boundary lines 28a through 28d are being adjusted or not is 1 or not. When the flag FLG is 0, it indicates that the boundary lines 28a through 28d are not being adjusted, and when the flag FLG is 1, it indicates that the boundary lines 28a through 28d are being adjusted.

If the boundary lines 28a through 28d are not being adjusted (S2: NO), then the ECU 24 judges whether to start adjusting the boundary lines 28a through 28d or not in step S3. Specifically, the ECU 24 judges whether the central button 30 has been pressed for a predetermined period of time (e.g., a period of time in the range from 2 to 5 seconds) or not. If the boundary lines 28a through 28d are to be adjusted (S3: YES), then the ECU 24 executes a boundary line adjustment starting process in step S4. If the boundary lines 28a through 28d are not to be adjusted (S3: NO), then the ECU 24 executes an ordinary process in step S6.

If the boundary lines 28a through 28d are being adjusted (S2: YES), then the ECU 24 executes a boundary line adjusting process in step S5.

[5-2. Detection of the Direction X of Gaze of the Driver 100 (S1 in FIG. 11)]

The direction X of gaze of the driver 100 may be detected according to the process disclosed in JP2010-105417A, for example (see, for example, paragraphs [0014] through [0016]).

The face direction of the driver may be detected according to the following process, for example: The ECU 24 (the direction-of-gaze detecting function 70) detects the central position of the face and the left and right end positions of the face based on the face image from the occupant camera 14. Based on the detected central position of the face and the detected left and right end positions of the face, the ECU 24 calculates the face direction by approximating the face of a person with a cylinder shape (cylinder process). The face direction is used in a wide sense, and may include not only the front side of the head but also other portions thereof (e.g., the rear head portion).

[5-3. Adjustment of the Boundary Lines 28a Through 28d (S4, S5 in FIG. 11)]

(5-3-1. General)

FIG. 12 is a view showing the boundary lines 28a through 28d before and after they are adjusted. According to the present embodiment, as shown in FIG. 12, it is possible to adjust the positions of the indicators 26a through 26e by adjusting the boundary lines 28a through 28d. If the boundary lines 28a through 28d are adjusted, the regions A1 through A5 are associated with the respective indicators 26a through 26e while the positions of the regions A1 through A5 remain as they are. Since the boundary lines 28a through 28d are adjusted, even if the direction X of gaze detected by the controlling apparatus 12 deviate from the direction X of gaze intended by the driver 100, it is possible to detect the direction X of gaze reasonably in line with the actual direction X of gaze.

(5-3-2. Boundary Line Adjustment Starting Process)

Figure 13:
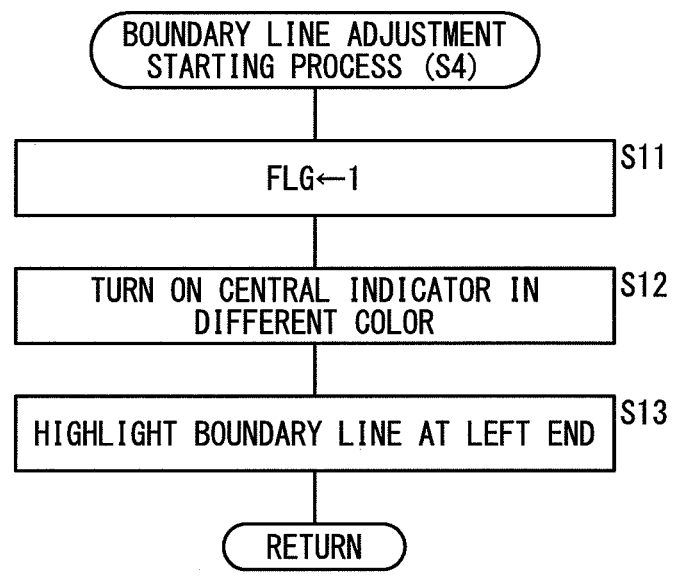
FIG. 13 is a flowchart of a boundary line adjustment starting process (S4 in FIG. 11)

FIG. 13 is a flowchart of the boundary line adjustment starting process (S4 in FIG. 11). FIG. 14 is a view showing by way of example how the display device 22 changes in state from the time before the boundary lines 28*a* through 28*d* start to be adjusted to the time when the boundary lines 28*a* through 28*d* start to be adjusted.

In step S11 shown in FIG. 13, the ECU 24 sets the flag FLG to 1. As described above, when the flag FLG is 1, it indicates that the boundary lines 28*a* through 28*d* are being adjusted.

In step S12, the ECU 24 turns on the central indicator 26*a* to emit light in a color (e.g., blue) different from the normal display color (e.g., green) (see FIG. 14), regardless of the direction X of gaze of the driver 100. According to the present embodiment, the ECU 24 turns on the boundary lines 28*a* through 28*d* even if any one of the vehicle-mounted equipment groups (groups A through D) is not specified.

In step S13, the ECU 24 highlights the boundary line 28*c* at the left end with respect to the direction of travel of the vehicle 10. The ECU 24 may highlight the boundary line 28*c* by turning it on to emit color in a color (e.g., yellow) different from the normal display color (e.g., blue). Alternatively, the ECU 24 may highlight the boundary line 28*c* by making the width thereof greater than usual, or may highlight the boundary line 28*c* by making the brightness thereof higher than usual. These highlighting alternatives may be used in combination.

(5-3-3. Boundary Line Adjusting Process)

Figure 15:
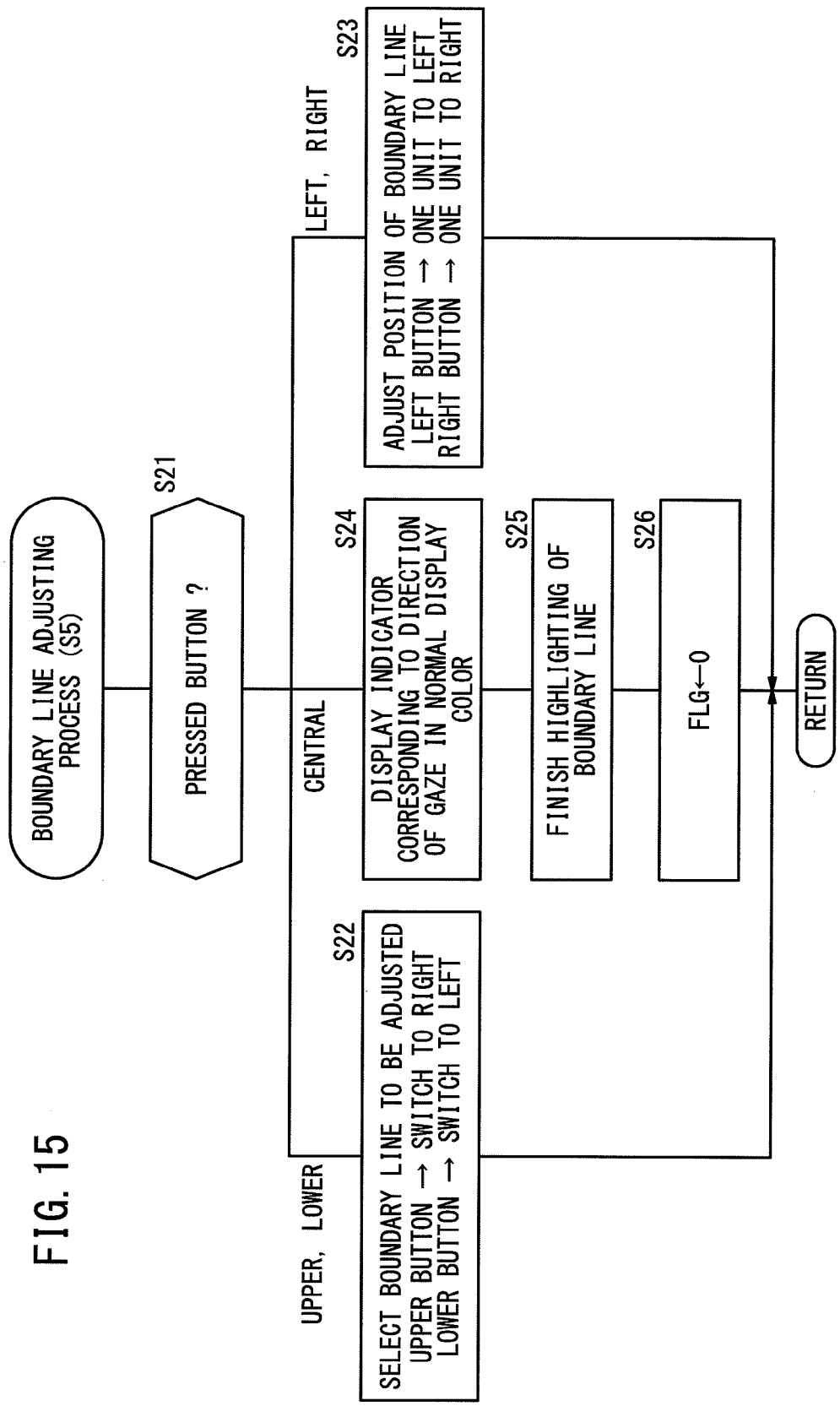
FIG. 15 is a flowchart of a boundary line adjusting process (S5 in FIG. 11)
Figure 16:
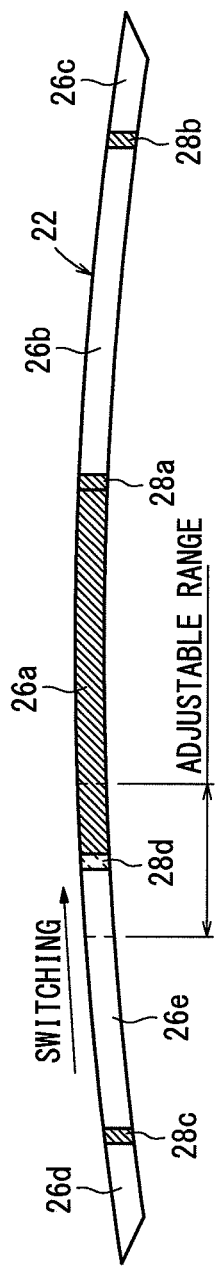
FIG. 16 is a view illustrating the boundary line adjusting process.

FIG. 15 is a flowchart of the boundary line adjusting process (S5 in FIG. 11). FIG. 16 is a view illustrating the boundary line adjusting process which adjusts the boundary lines 28*a* through 28*d*. FIG. 17 is a view showing by way of example how the display device 22 changes in state from the time when the boundary lines 28*a* through 28*d* are being adjusted to the time when the adjustment of the boundary lines 28*a* through 28*d* is ended.

In step S21, the ECU 24 judges whether a pressed button of the crisscross key 18 is the central button 30, the upper button 32, the lower button 34, the left button 36, or the right button 38.

If the pressed button is the upper button 32 or the lower button 34, then the ECU 24 selects one of the boundary lines 28*a* through 28*d* to be adjusted in step S22. Specifically, if the upper button 32 is pressed, then the ECU 24 switches to the right from any one of the boundary lines 28*a* through 28*d* to be adjusted (see FIG. 16). For example, if the upper button 32 is pressed when the boundary line 28*c* at the left end is a target boundary line to be adjusted, then the boundary line 28*d* to the right of the boundary line 28*c* is selected. If the lower button 34 is pressed, then the ECU 24 switches to the left from any one of the boundary lines 28*a* through 28*d* to be adjusted. For example, if the lower button 34 is pressed when the boundary line 28*c* at the left end is a target boundary line to be adjusted, then the boundary line 28*b* at the right end is selected because no boundary line exists to the left of the boundary line 28*c*.

If the pressed button is the left button 36 or the right button 38, then the ECU 24 adjusts the position of one of the boundary lines 28*a* through 28*d* to be adjusted in step S23. Specifically, if the left button 36 is pressed, then the ECU 24 shifts, by one unit to the left, one of the boundary lines 28*a* through 28*d* as a target boundary line to be adjusted (see FIG. 16). If the right button 38 is pressed, then the ECU 24 shifts, by one unit to the right, one of the boundary lines 28*a* through 28*d* as a target boundary line to be adjusted. As shown in FIG. 16, an adjustable range is established for each of the boundary lines 28*a* through 28*d*. The boundary lines 28*a* through 28*d* cannot be shifted beyond their adjustable ranges.

If the pressed button is the central button 30, then the ECU 24 turns on one of the indicators 26*a* through 26*e* that corresponds to the direction X of gaze to emit in the normal display color (green) in step S24. In step S25, the ECU 24 finishes the highlighting of the target one of the boundary lines 28*a* through 28*d* to be adjusted (see FIG. 17). In step S26, the ECU 24 resets the flag FLG to 0. As described above, when the flag FLG is 0, it indicates that the boundary lines 28*a* through 28*d* are not being adjusted.

[5-4. Overall Ordinary Process (S6 in FIG. 11)]

Figure 18:
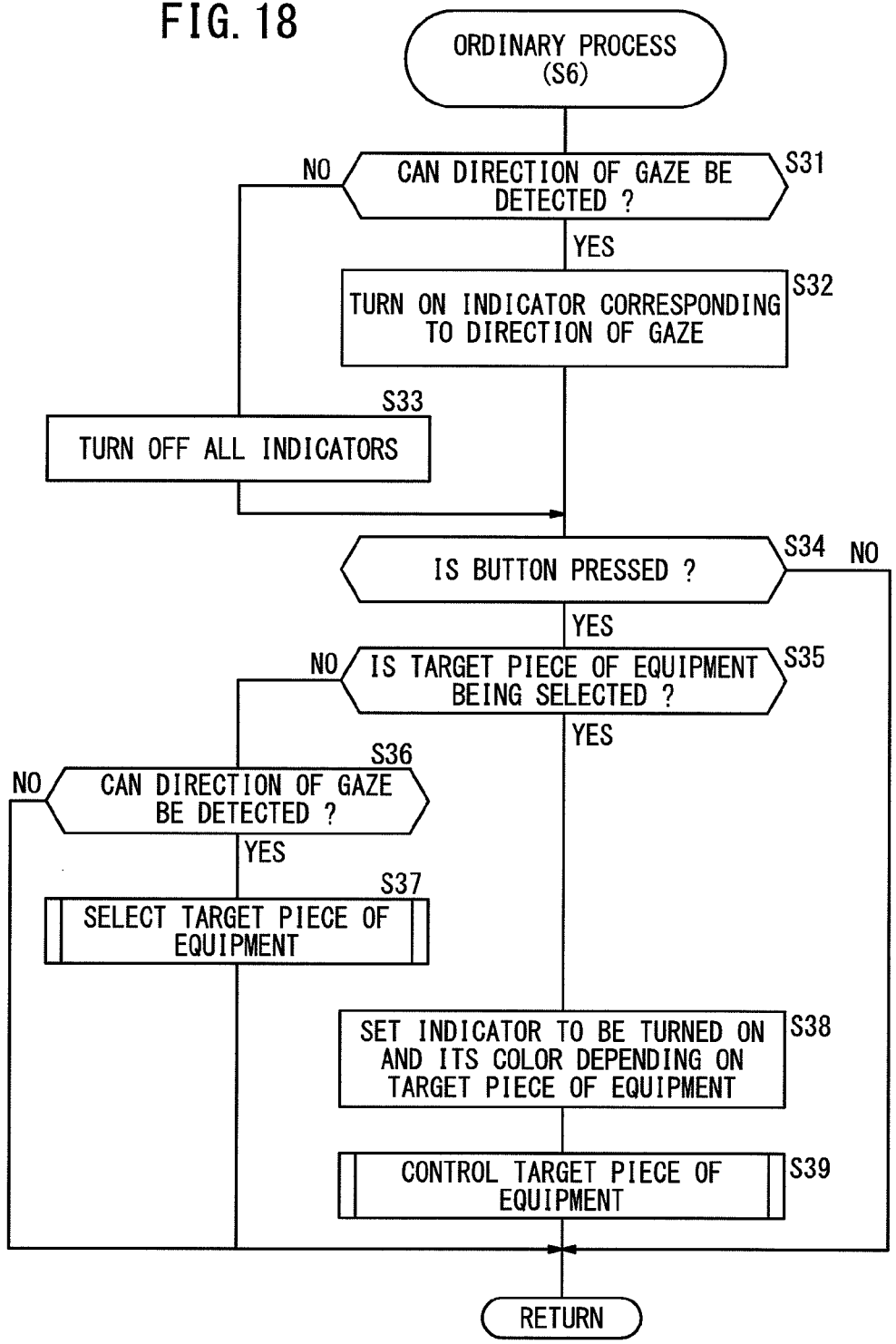
FIG. 18 is a flowchart of an ordinary process (S6 in FIG. 11)

FIG. 18 is a flowchart of the ordinary process (S6 in FIG. 11). In step S31, the ECU 24 judges whether it has been able to detect the direction X of gaze or not in step S1 shown in FIG. 11. If the ECU 24 has been able to detect the direction X of gaze (S31: YES), then the ECU 24 turns on one of the indicators 26*a* through 26*e* which corresponds to the direction X of gaze in step S32. If the ECU 24 has not been able to detect the direction X of gaze (S31: NO), then the ECU 24 turns off the indicators 26*a* through 26*e* in step S33.

Figure 19A:
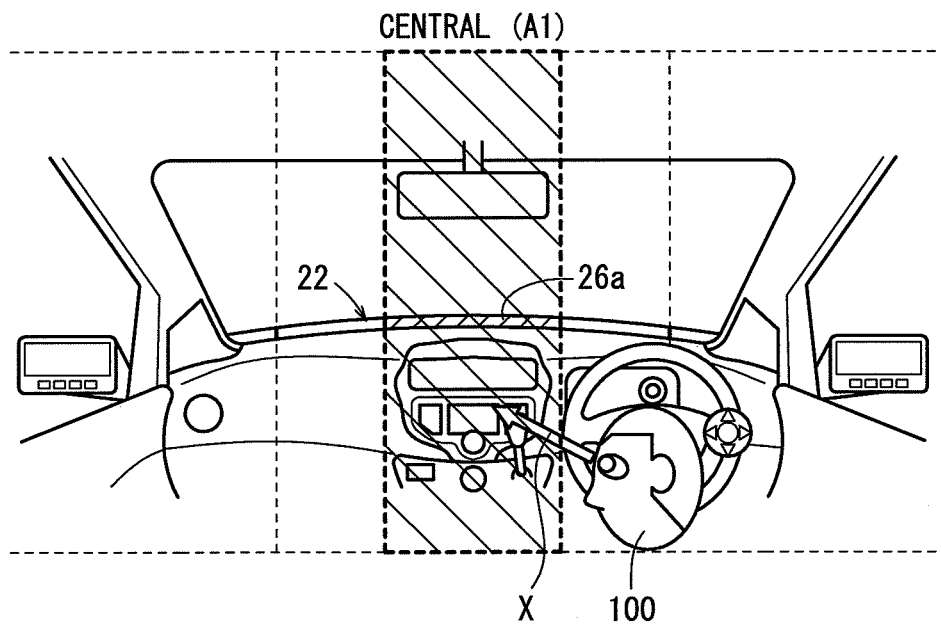
FIG. 19A is a view showing by way of example the manner in which the direction of gaze is detected normally.
Figure 19B:
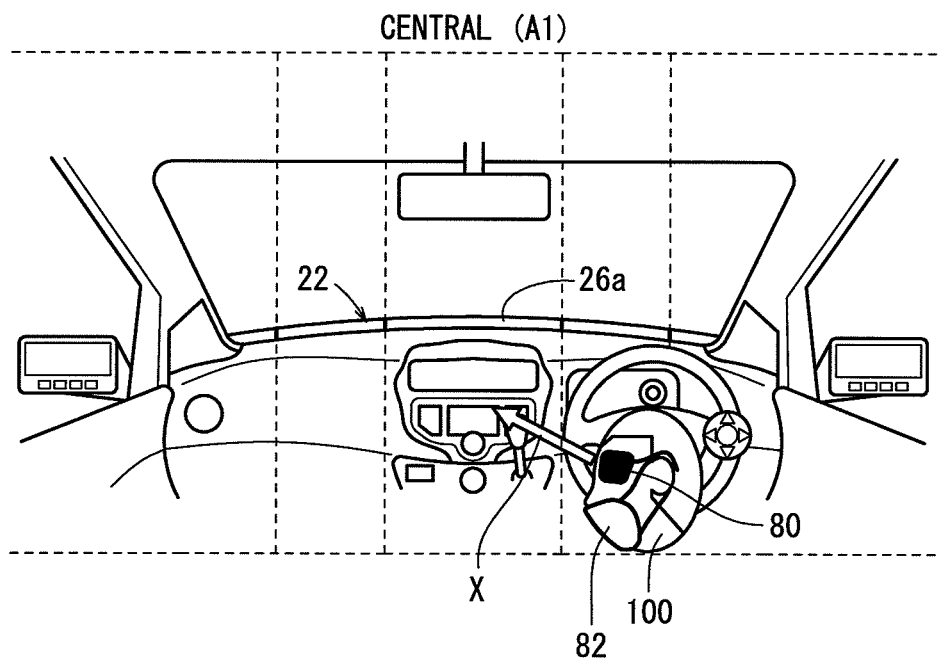
FIG. 19B is a view showing by way of example the manner in which the direction of gaze cannot be detected.
Figure 19C:
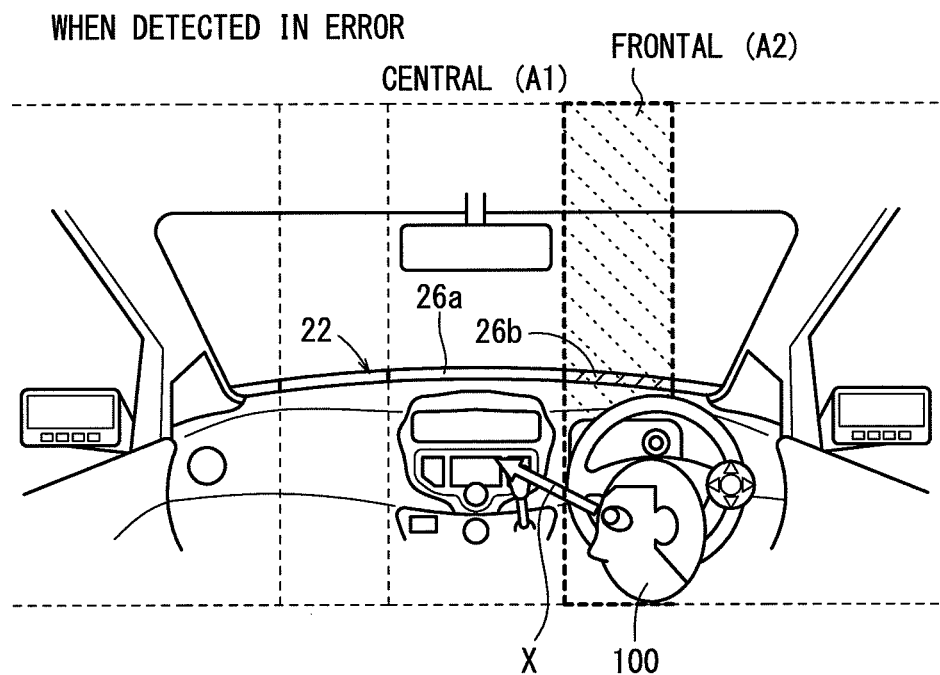
FIG. 19C is a view showing by way of example the manner in which the direction of gaze is detected in error.

FIGS. 19A through 19C are first through third views illustrating advantages achieved when the indicators 26*a* through 26*e* are turned on or off. As shown in FIG. 19A, when the direction X of gaze of the driver 100 and the indicator 26*a* that is turned on are in alignment with each other, the driver 100 knows that a vehicle-mounted equipment group is properly selected based on the direction X of gaze.

As shown in FIG. 19B, if the driver 100 wears sunglasses 80, the direction of the line of sight of the driver 100 cannot be detected, or if the driver 100 wears a mask 82, the face direction of the driver 100 cannot be detected. Therefore, the direction X of gaze of the driver 100 cannot be detected. At this time, any one of the indicators 26*a* through 26*e* is not turned on. Therefore, the driver 100 knows that the direction X of gaze has not been detected, and hence recognizes the need to take off the sunglasses 80 or the mask 82.

As shown in FIG. 19C, when the direction X of gaze of the driver 100 and the indicator 26*b* that is turned on are not aligned with each other, the driver 100 knows that a vehicle-mounted equipment group is wrongly selected based on the direction X of gaze. It is thus possible for the driver 100 to recognize that the boundary lines 28*a* through 28*d* should be adjusted as described above or the direction X of gaze thereof should be corrected (in FIG. 19C, the driver 100 should face more to the left).

In step S34 shown in FIG. 18, the ECU 24 judges whether any one button of the crisscross key 18 has been pressed or not. If any one button of the crisscross key 18 has not been pressed (S34: NO), then the present cycle of the ordinary process is ended. If any one button of the crisscross key 18 has been pressed (S34: YES), then the ECU 24 judges whether a target piece of equipment is being selected at present or not in step S35. If a target piece of equipment is not being selected (S35: NO), then the ECU 24 judges whether it has been able to detect the direction X of gaze in step S1 shown in FIG. 11 or not in step S36. If the ECU 24 has been able to detect the direction X of gaze (S36: YES), then the ECU 24 selects a target piece of equipment based on a controlling action of the driver 100 in step S37. If the ECU 24 has been unable to detect the direction X of gaze (S36: NO), then it puts an end to the present cycle of the ordinary process.

If a target piece of equipment is being selected (S35: YES), then the ECU 24 sets one of the indicators 26a through 26e and a color of its emitted light depending on the selected target piece of equipment in step S38. In step S39, the ECU 24 controls the target piece of equipment based on a controlling action of the driver 100.

[5-5. Selection of a Target Piece of Equipment (S37 in FIG. 18)]

(5-5-1. General)

Figure 20:
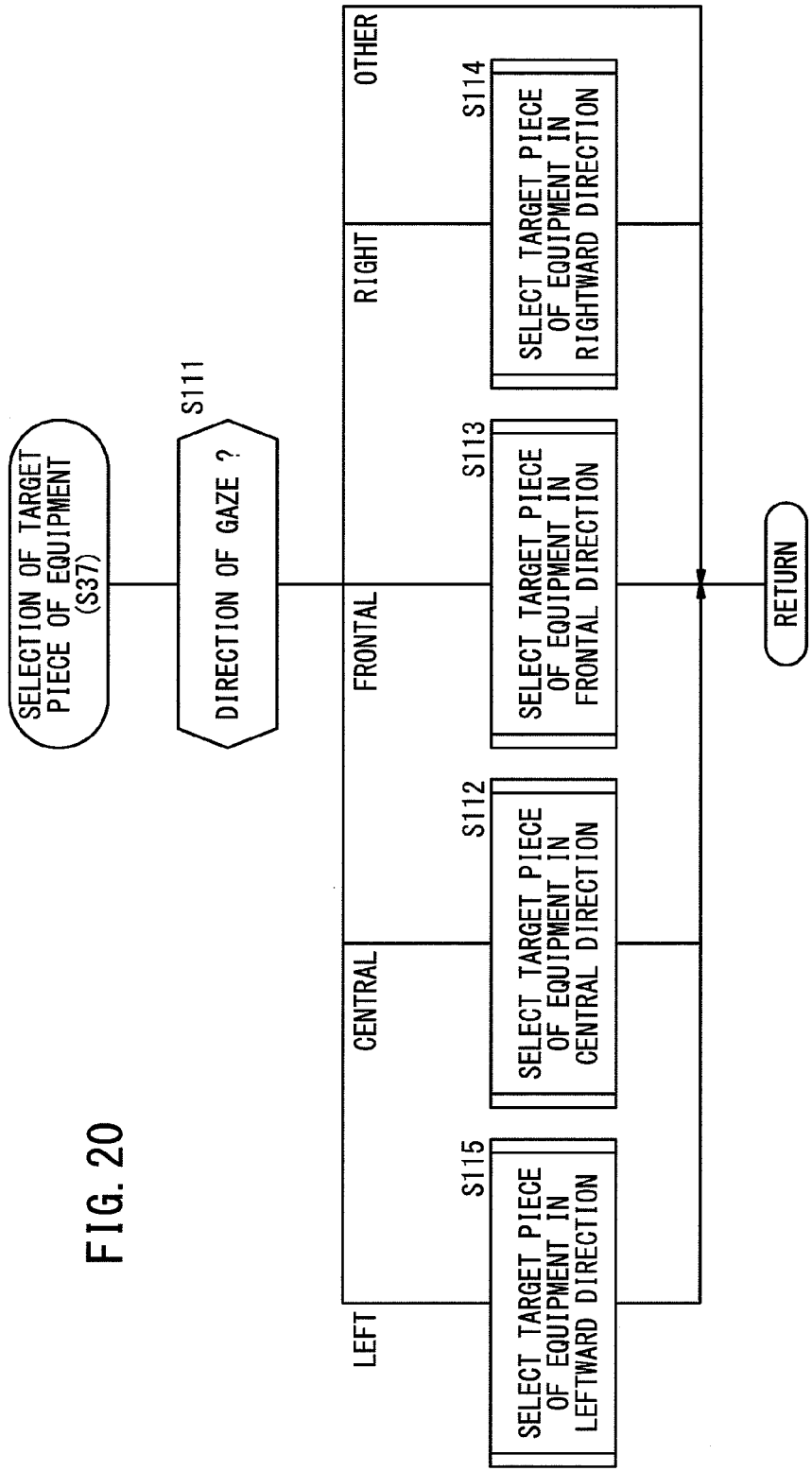
FIG. 20 is a flowchart of an operation sequence of the ECU for selecting a target piece of vehicle-mounted equipment to be controlled.

FIG. 20 is a flowchart of an operation sequence of the ECU 24 for selecting a target piece of vehicle-mounted equipment to be controlled (details of S37 shown in FIG. 18). In step S111, the ECU 24 confirms whether the direction X of gaze of the driver 100 that has been specified in step S1 shown in FIG. 11 is the central, front, rightward, leftward, or another direction.

If the direction X of gaze of the driver 100 is the central direction (the region A1), then the ECU 24 specifies the vehicle-mounted equipment group in the central direction, i.e., the group A including the navigation device 40, the audio device 42, and the air conditioner 44, and selects a target piece of equipment from the group A in step S112.

If the direction X of gaze of the driver 100 is the frontal direction (the region A2), then the ECU 24 specifies the vehicle-mounted equipment group in the frontal direction, i.e., the group B including the HUD 46, the hazard lamp 48, and the seat 50, and selects a target piece of equipment from the group B in step S113.

If the direction X of gaze of the driver 100 is the rightward direction (the region A3), then the ECU 24 specifies the vehicle-mounted equipment group in the rightward direction, i.e., the group C including the door mirror 52, the rear light 54, and the driver seat side window 56, and selects a target piece of equipment from the group C in step S114.

If the direction X of gaze of the driver 100 is the leftward direction (the region A4), then the ECU 24 specifies the vehicle-mounted equipment group in the leftward direction, i.e., the group D including the door mirror 52, the rear light 54, and the front passenger seat side window 58, and selects a target piece of equipment from the group D in step S115.

If the direction X of gaze of the driver 100 is the other direction (the region A5), then the ECU 24 does not select any one of the pieces 20 of vehicle-mounted equipment, and puts an end to the present cycle of the operation sequence shown in FIG. 20.

(5-5-2. Central Direction)

Figure 21:
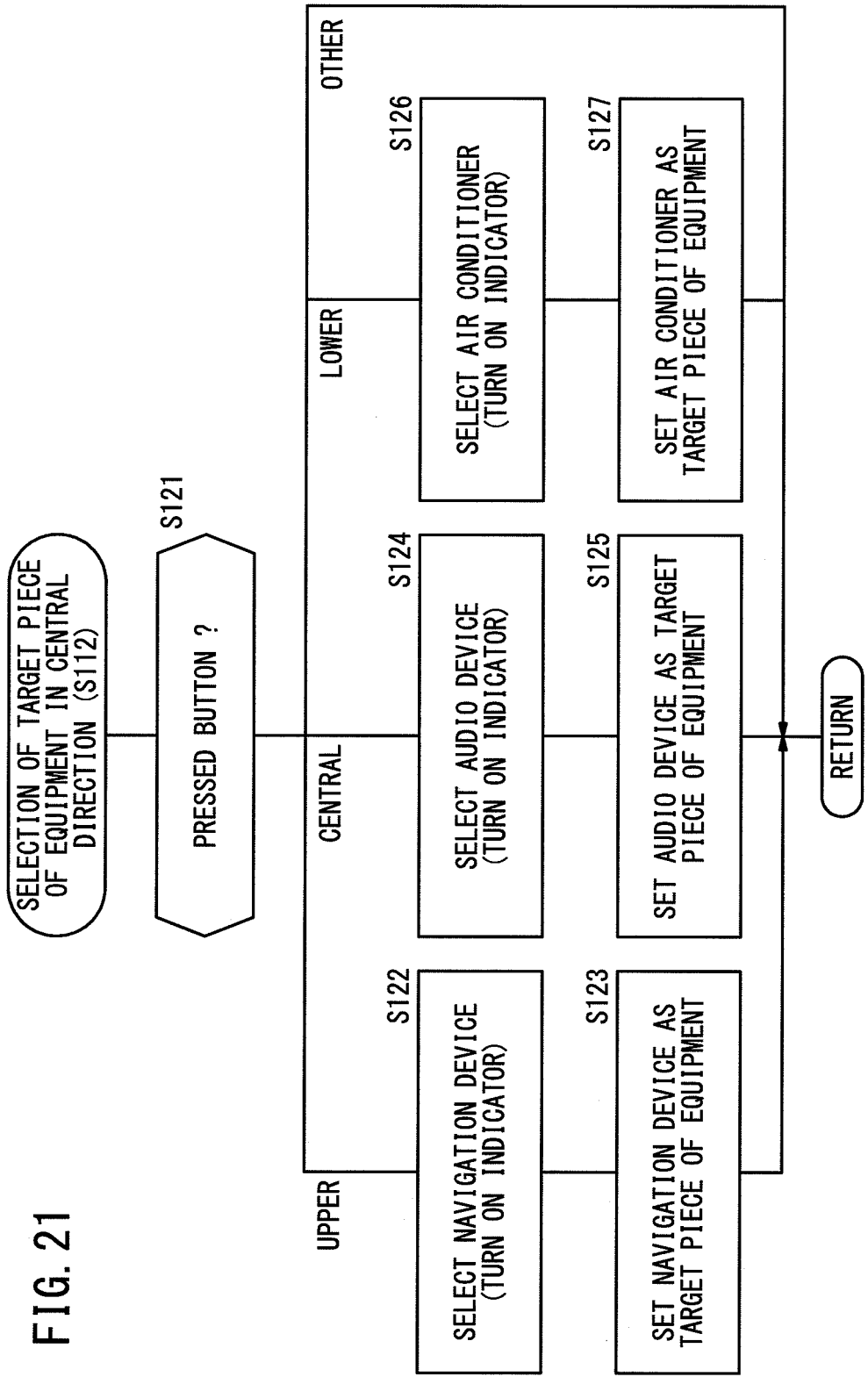
FIG. 21 is a flowchart of an operation sequence for selecting a target piece of vehicle-mounted equipment to be controlled if the direction of gaze of the driver is a central direction.

FIG. 21 is a flowchart of an operation sequence for selecting a target piece of vehicle-mounted equipment to be controlled if the direction X of gaze of the driver 100 is the central direction (the region A1) (details of S112 in FIG. 20). In step S121, the ECU 24 judges whether the pressed button of the crisscross key 18 is the central button 30, the upper button 32, the lower button 34, or any of the other buttons.

If the pressed button is the upper button 32, then the ECU 24 selects the navigation device 40 and turns on the central indicator 26a in step S122. In step S123, the ECU 24 sets the navigation device 40 as a target piece of equipment.

If the pressed button is the central button 30, then the ECU 24 selects the audio device 42 and turns on the central indicator 26a in step S124. In step S125, the ECU 24 sets the audio device 42 as a target piece of equipment.

If the pressed button is the lower button 34, then the ECU 24 selects the air conditioner 44 and turns on the central indicator 26a in step S126. In step S127, the ECU 24 sets the air conditioner 44 as a target piece of equipment.

If the pressed button is not any one of the upper button 32, the central button 30, and the lower button 34, then the ECU 24 puts an end to the present cycle of the operation sequence.

(5-5-3. Frontal Direction)

Figure 22:
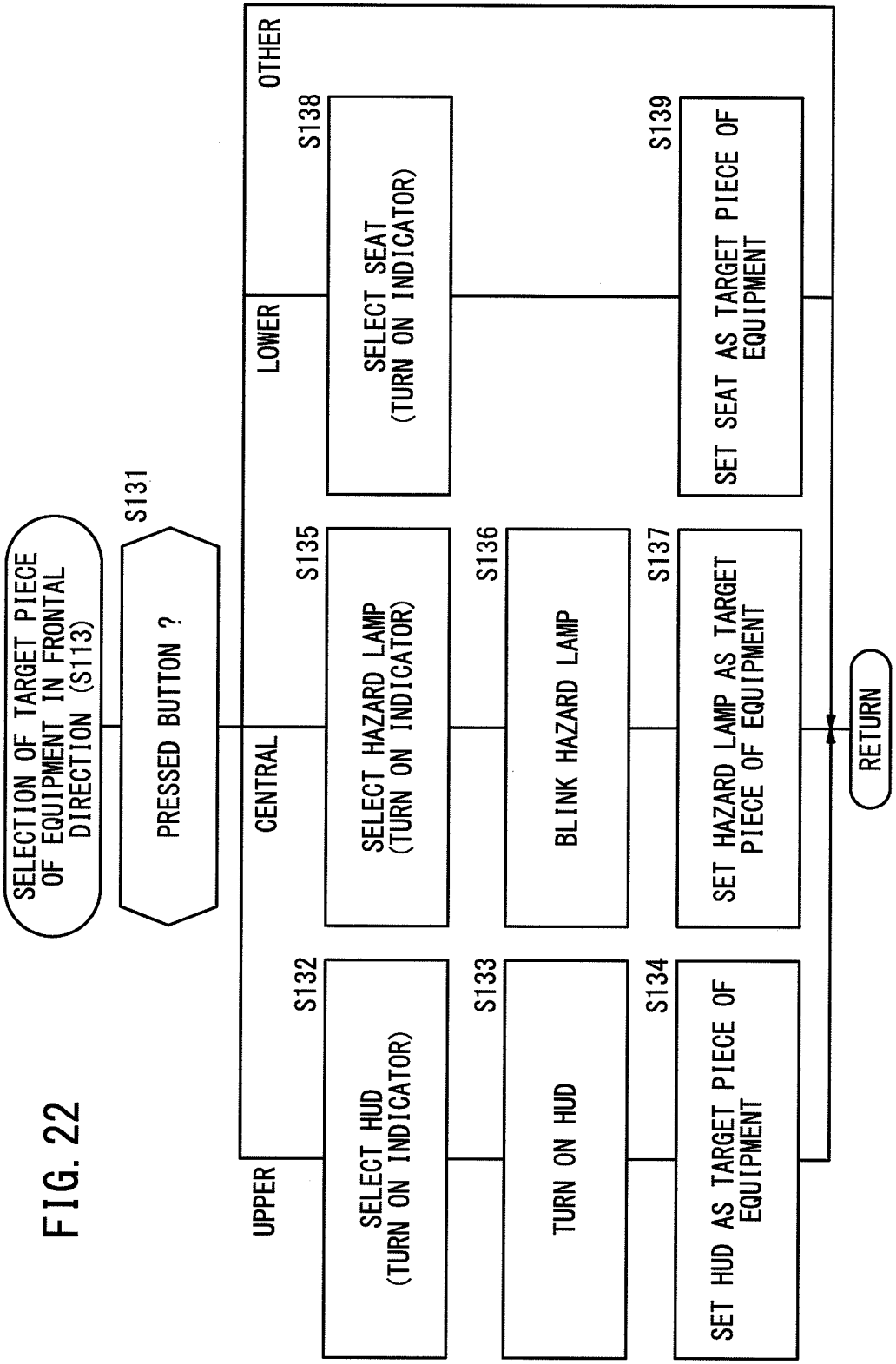
FIG. 22 is a flowchart of an operation sequence for selecting a target piece of vehicle-mounted equipment to be controlled if the direction of gaze of the driver is a frontal direction.

FIG. 22 is a flowchart of an operation sequence for selecting a target piece of vehicle-mounted equipment to be controlled if the direction X of gaze of the driver 100 is the frontal direction (the region A2) (details of S113 in FIG. 20). In step S131, the ECU 24 judges whether the pressed button of the crisscross key 18 is the central button 30, the upper button 32, the lower button 34, or any of the other buttons.

If the pressed button is the upper button 32, then the ECU 24 selects the HUD 46 and turns on the frontal indicator 26b in step S132. In step S133, the ECU 24 turns on the HUD 46, thereby displaying the HUD 46 on the front windshield 11. In step S134, the ECU 24 sets the HUD 46 as a target piece of equipment.

If the pressed button is the central button 30, then the ECU 24 selects the hazard lamp 48 and turns on the frontal indicator 26b in step S135. In step S136, the ECU 24 blinks the hazard lamp 48. In step S137, the ECU 24 sets the hazard lamp 48 as a target piece of equipment.

If the pressed button is the lower button 34, then the ECU 24 selects the seat 50 and turns on the frontal indicator 26b in step S138. In step S139, the ECU 24 sets the seat 50 as a target piece of equipment.

If the pressed button is not any one of the upper button 32, the central button 30, and the lower button 34, then the ECU 24 puts an end to the present cycle of the operation sequence.

(5-5-4. Rightward Direction)

Figure 23:
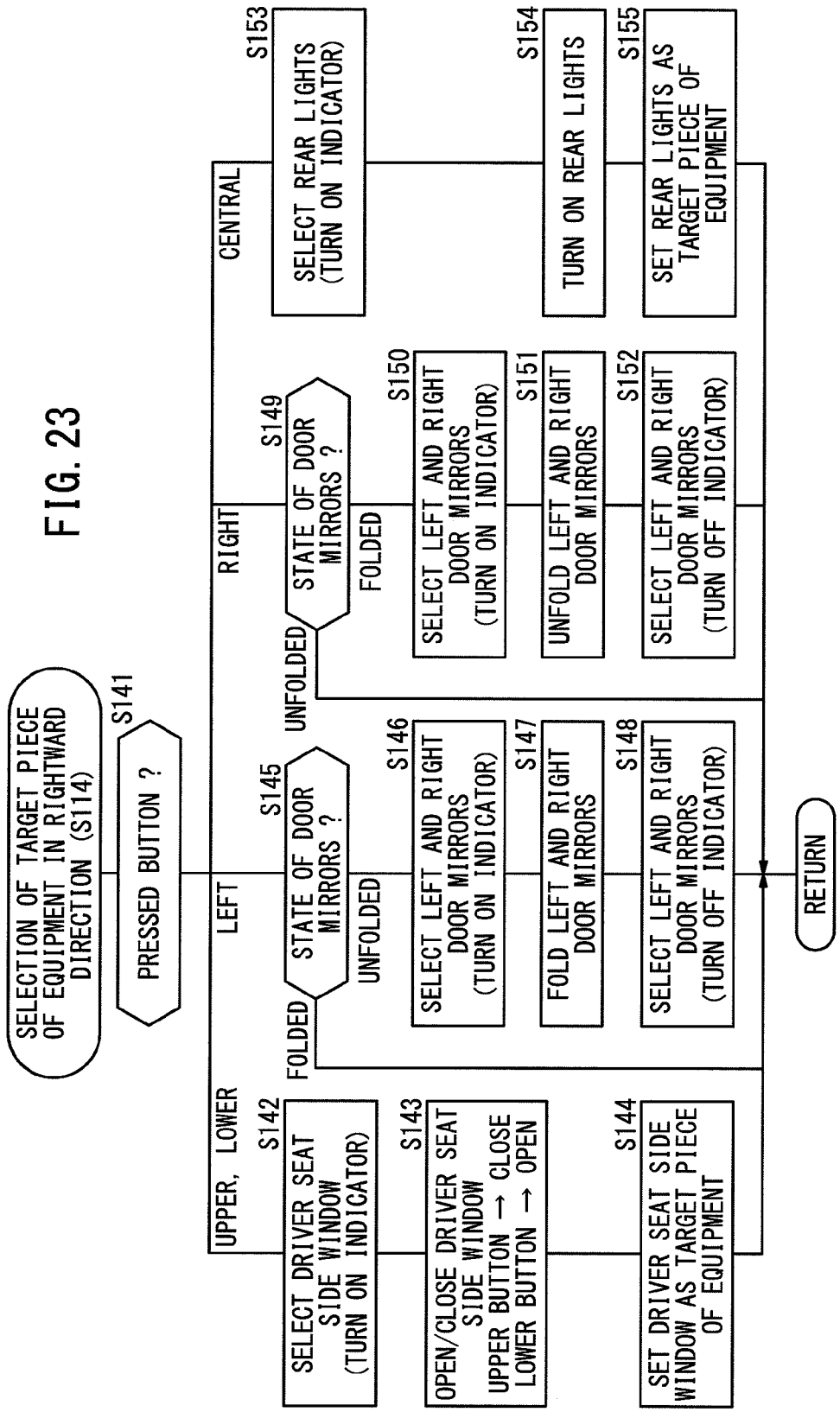
FIG. 23 is a flowchart of an operation sequence for selecting a target piece of vehicle-mounted equipment to be controlled if the direction of gaze of the driver is a rightward direction.

FIG. 23 is a flowchart of an operation sequence for selecting a target piece of vehicle-mounted equipment to be controlled if the direction X of gaze of the driver 100 is the rightward direction (the region A3) (details of S114 in FIG. 20). In step S141, the ECU 24 judges whether the pressed button of the crisscross key 18 is the central button 30, the upper button 32, the lower button 34, the left button 36, or the right button 38.

If the pressed button is the upper button 32 or the lower button 34, then the ECU 24 selects the driver seat side window 56 and turns on the right indicator 26c in step S142. In step S143, the ECU 24 opens or closes the driver seat side window 56. Specifically, if the lower button 34 is pressed, the ECU 24 opens the driver seat side window 56, and if the upper button 32 is pressed, the ECU 24 closes the driver seat side window 56. In step S144, the ECU 24 sets the driver seat side window 56 as a target piece of equipment.

If the pressed button is the left button 36, then the ECU 24 confirms the state (unfolded or folded) of the door mirrors 52 in step S145. If the door mirrors 52 are folded, then the ECU 24 puts an end to the present cycle of the operation sequence shown in FIG. 23. If the door mirrors 52 are unfolded, then the ECU 24 selects both the left and right door mirrors 52 and turns on the right indicator 26c in step S146.

In step S147, the ECU 24 folds the left and right door mirrors 52. In step S148, the ECU 24 selects the left and right door mirrors 52 and turns off the right indicator 26c.

If the pressed button is the right button 38, the ECU 24 confirms the state (unfolded or folded) of the door mirrors 52 in step S149. If the door mirrors 52 are unfolded, then the ECU 24 puts an end to the present cycle of the operation sequence. If the door mirrors 52 are folded, then the ECU 24 selects both the left and right door mirrors 52 and turns on the right indicator 26c in step S150.

In step S151, the ECU 24 unfolds the left and right door mirrors 52. In step S152, the ECU 24 selects the left and right door mirrors 52 and turns off the right indicator 26c.

If the pressed button is the central button 30, then the ECU 24 selects the rear lights 54 and turns on the right indicator 26c in step S153. In step S154, the ECU 24 turns on the rear lights 54. In step S155, the ECU 24 sets the rear lights 54 as a target piece of equipment.

(5-5-5. Leftward Direction)

Figure 24:
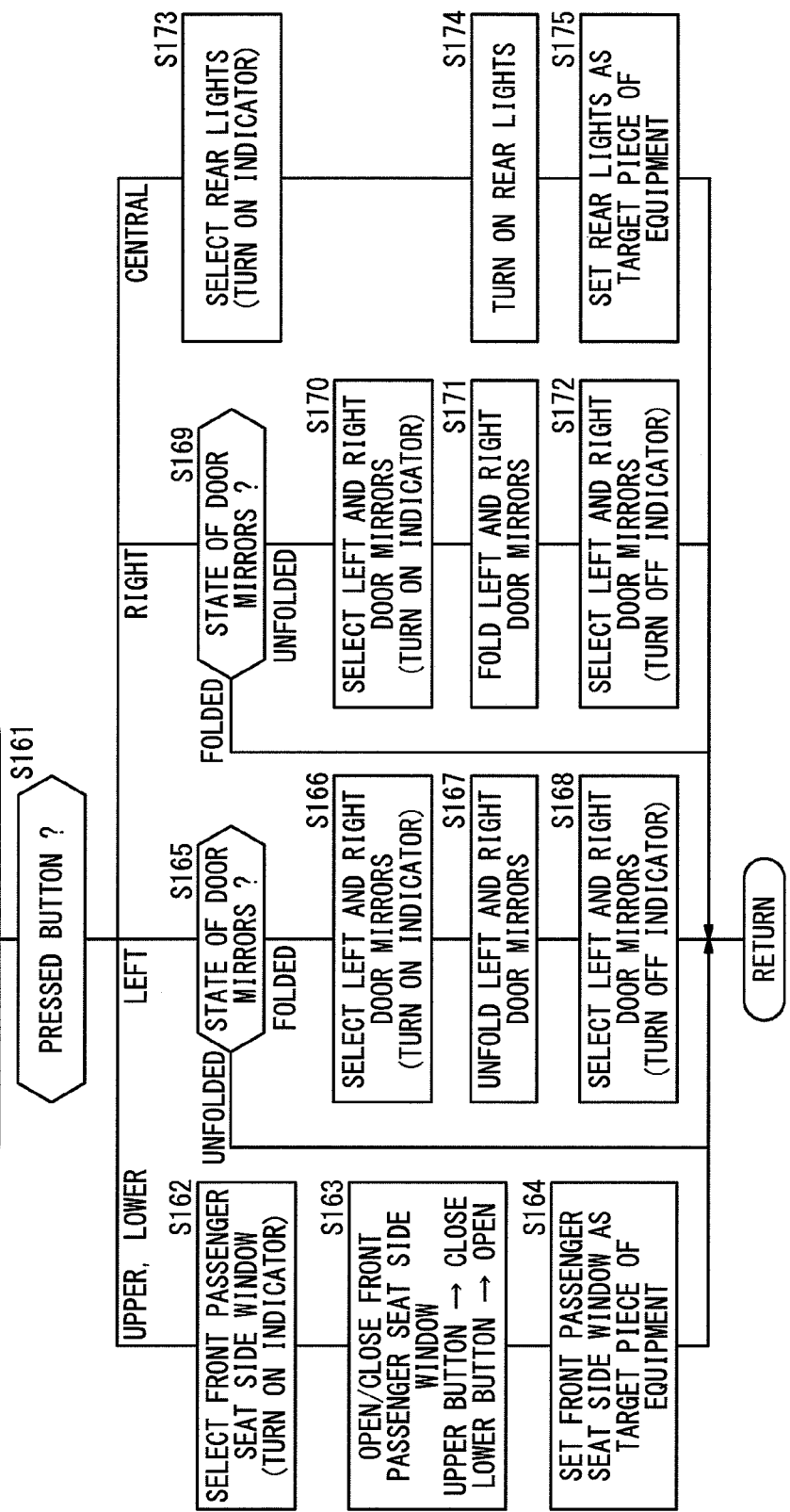
FIG. 24 is a flowchart of an operation sequence for selecting a target piece of vehicle-mounted equipment to be controlled if the direction of gaze of the driver is a leftward direction.

FIG. 24 is a flowchart of an operation sequence for selecting a target piece of vehicle-mounted equipment to be controlled if the direction X of gaze of the driver 100 is the leftward direction (the region A4) (details of S115 in FIG. 20). In step S161, the ECU 24 judges whether the pressed button of the crisscross key 18 is the upper button 32, the central button 30, the lower button 34, the left button 36, or the right button 38.

If the pressed button is the upper button 32 or the lower button 34, then the ECU 24 selects the front passenger seat side window 58 and turns on the left indicator 26d in step S162. In step S163, the ECU 24 opens or closes the front passenger seat side window 58. Specifically, if the lower button 34 is pressed, the ECU 24 opens the front passenger seat side window 58, and if the upper button 32 is pressed, the ECU 24 closes the front passenger seat side window 58. In step S164, the ECU 24 sets the front passenger seat side window 58 as a target piece of equipment.

If the pressed button is the left button 36, the ECU 24 confirms the state (unfolded or folded) of the door mirrors 52 in step S165. If the door mirrors 52 are unfolded, then the ECU 24 puts an end to the present cycle of the operation sequence shown in FIG. 24. If the door mirrors 52 are folded, then the ECU 24 selects both the left and right door mirrors 52 and turns on the left indicator 26d in step S166.

In step S167, the ECU 24 unfolds the left and right door mirrors 52. In step S168, the ECU 24 selects the left and right door mirrors 52 and turns off the left indicator 26d.

If the pressed button is the right button 38, then the ECU 24 confirms the state (unfolded or folded) of the door mirrors 52 in step S169. If the door mirrors 52 are folded, then the ECU 24 puts an end to the present cycle of the operation sequence. If the door mirrors 52 are unfolded, then the ECU 24 selects both the left and right door mirrors 52 and turns on the left indicator 26d in step S170.

In step S171, the ECU 24 folds the left and right door mirrors 52. In step S172, the ECU 24 selects the left and right door mirrors 52 and turns off the left indicator 26d.

If the pressed button is the central button 30, then the ECU 24 selects the rear lights 54 and turns on the left indicator 26d in step S173. In step S174, the ECU 24 turns on the rear lights 54. In step S175, the ECU 24 sets the rear lights 54 as a target piece of equipment.

[5-6. Controlling of a Target Piece of Equipment (S39 in FIG. 18)]

(5-6-1. General)

Figure 25:
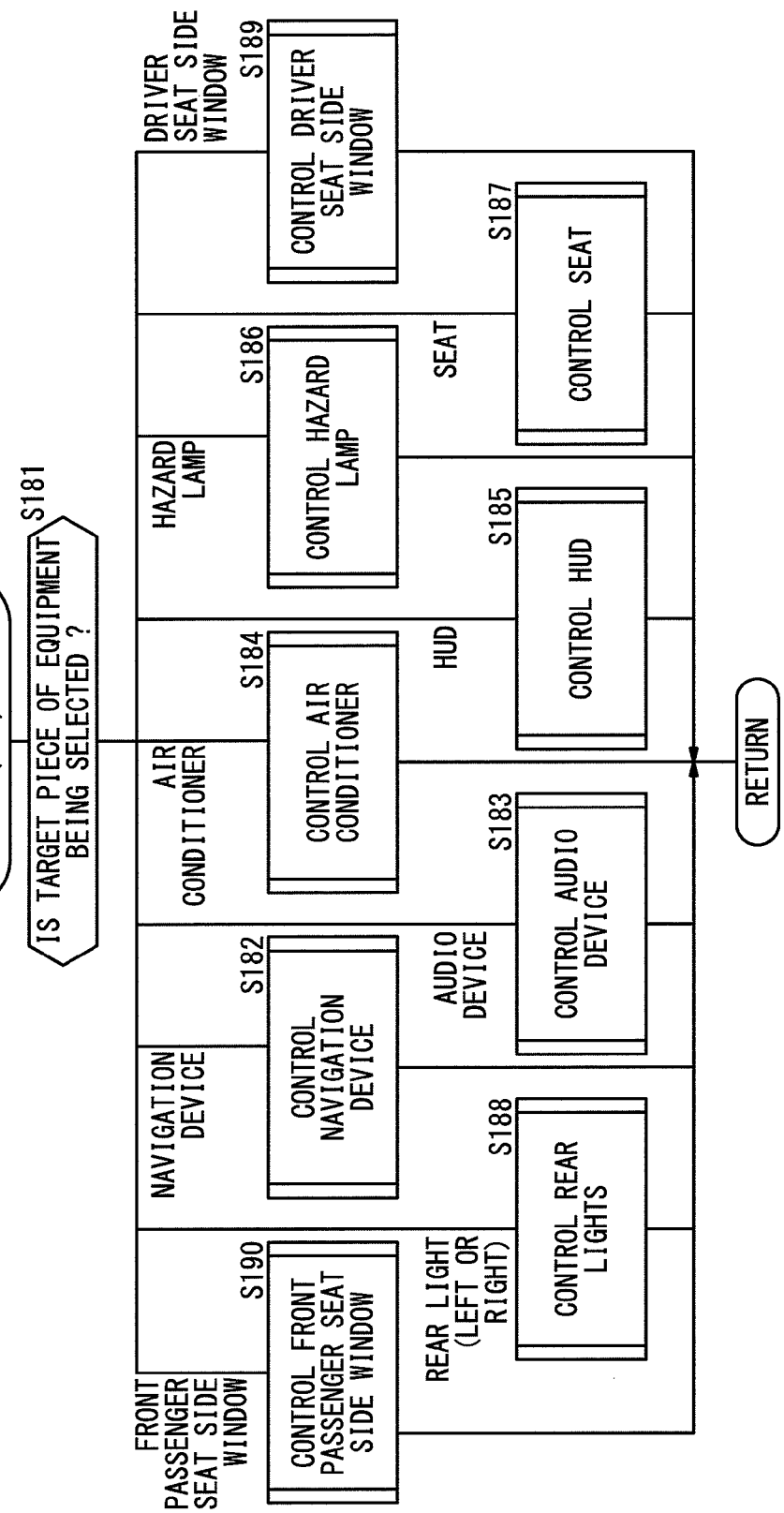
FIG. 25 is a flowchart of an operation sequence of the ECU for controlling a target piece of vehicle-mounted equipment to be controlled.

FIG. 25 is a flowchart of an operation sequence of the ECU 24 for controlling a target piece of vehicle-mounted equipment to be controlled (details of S39 in FIG. 18). In step S181, the ECU 24 confirms a target piece of equipment being selected in step S37 shown in FIG. 18. If the target piece of equipment being selected is the navigation device 40, then the ECU 24 controls the navigation device 40 in step S182. If the target piece of equipment being selected is the audio device 42, then the ECU 24 controls the audio device 42 in step S183. If the target piece of equipment being selected is the air conditioner 44, then the ECU 24 controls the air conditioner 44 in step S184.

If the target piece of equipment being selected is the HUD 46, then the ECU 24 controls the HUD 46 in step S185. If the target piece of equipment being selected is the hazard lamp 48, then the ECU 24 controls the hazard lamp 48 in step S186. If the target piece of equipment being selected is the seat 50, then the ECU 24 controls the seat 50 in step S187. If the target piece of equipment being selected is the rear lights 54, then the ECU 24 controls the rear lights 54 in step S188. If the target piece of equipment being selected is the driver seat side window 56, then the ECU 24 controls the driver seat side window 56 in step S189. If the target piece of equipment being selected is the front passenger seat side window 58, then the ECU 24 controls the front passenger seat side window 58 in step S190.

(5-6-2. Controlling of the Navigation Device 40)

Figure 26:
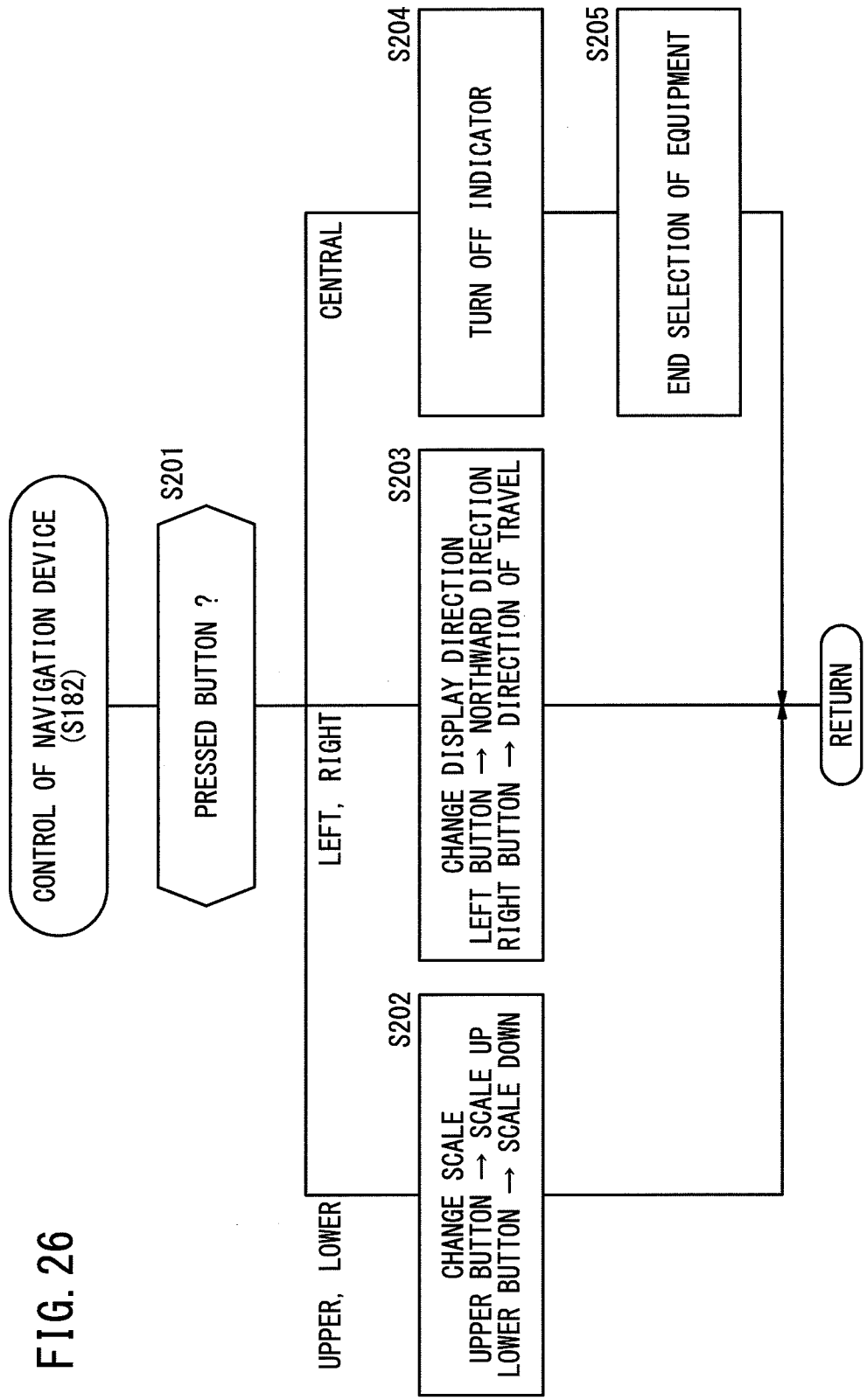
FIG. 26 is a flowchart of an operation sequence for controlling a navigation device.

FIG. 26 is a flowchart of an operation sequence for controlling the navigation device 40 (details of S182 in FIG. 25). In step S201, the ECU 24 judges whether a pressed button of the crisscross key 18 is the central button 30, the upper button 32, the lower button 34, the left button 36, or the right button 38.

If the pressed button is the upper button 32 or the lower button 34, then the ECU 24 changes the display scale of the navigation device 40 in step S202. Specifically, if the upper button 32 is pressed, then the ECU 24 increases the scale, and if the lower button 34 is pressed, then the ECU 24 reduces the scale.

If the pressed button is the left button 36 or the right button 38, then the ECU 24 changes the display direction of the navigation device 40 in step S203. Specifically, if the left button 36 is pressed, then the ECU 24 changes the display direction to the northward direction, and if the right button 38 is pressed, then the ECU 24 changes the display direction to the direction of travel of the vehicle 10.

If the pressed button is the central button 30, then the ECU 24 turns off the central indicator 26a in step S204. In step S205, the ECU 24 ends the selection of the target piece of equipment.

(5-6-3. Controlling of the Audio Device 42)

Figure 27:
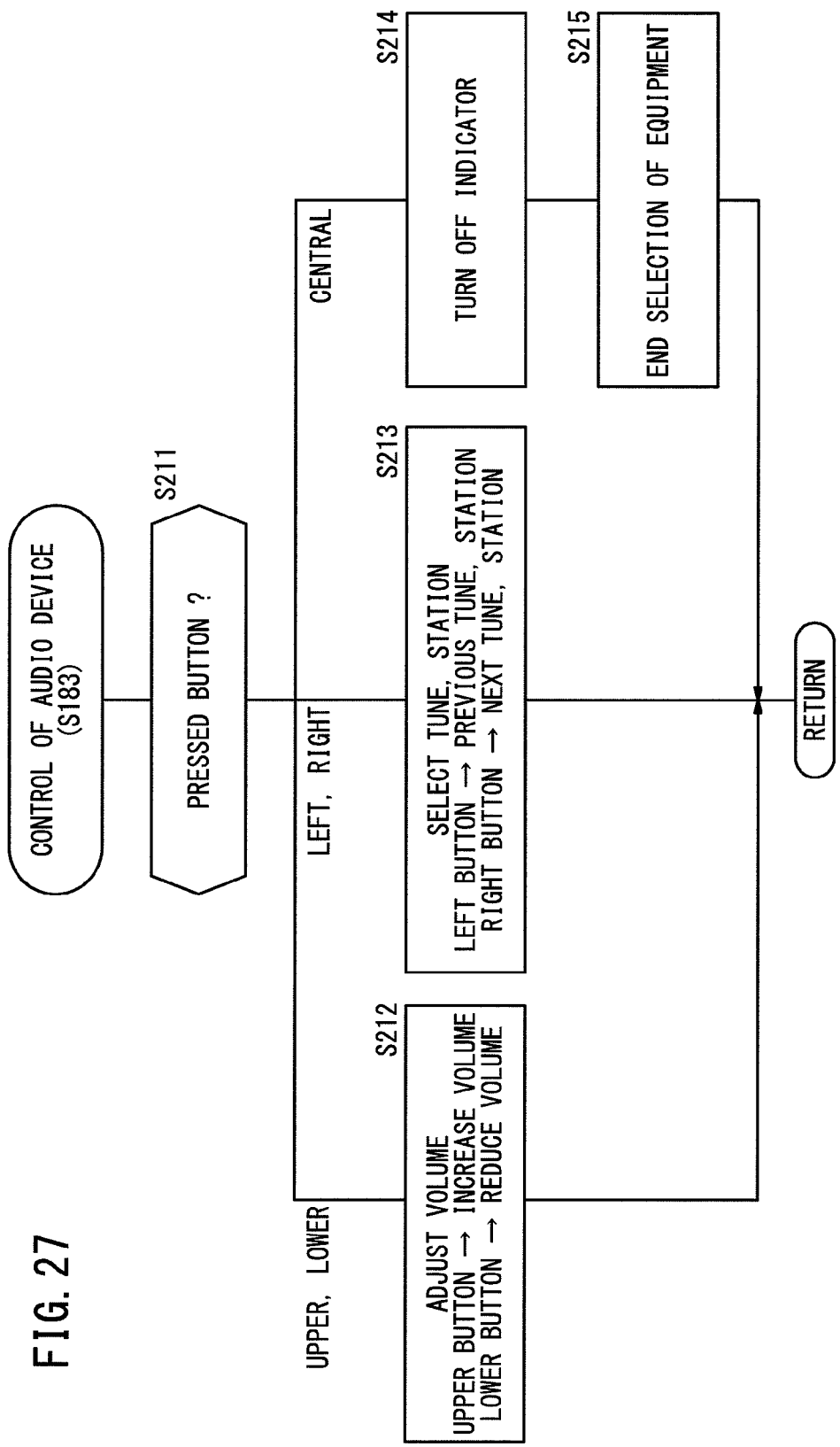
FIG. 27 is a flowchart of an operation sequence for controlling the audio device.

FIG. 27 is a flowchart of an operation sequence for controlling the audio device 42 (details of S183 in FIG. 25). In step S211, the ECU 24 judges whether a pressed button of the crisscross key 18 is the central button 30, the upper button 32, the lower button 34, the left button 36, or the right button 38.

If the pressed button is the upper button 32 or the lower button 34, then the ECU 24 adjusts the volume of the audio device 42 in step S212. Specifically, if the upper button 32 is pressed, then the ECU 24 increases the volume, and if the lower button 34 is pressed, then the ECU 24 reduces the volume.

If the pressed button is the left button 36 or the right button 38, then the ECU 24 changes a tune or a station in step S213. Specifically, if the left button 36 is pressed, then the ECU 24 changes to a previous tune or a previous broadcasting station, and if the right button 38 is pressed, then the ECU 24 changes to a next tune or a next broadcasting station.

If the pressed button is the central button 30, then the ECU 24 turns off the central indicator 26a in step S214. In step S215, the ECU 24 ends the selection of the target piece of equipment.

(5-6-4. Controlling of the Air Conditioner 44)

Figure 28:
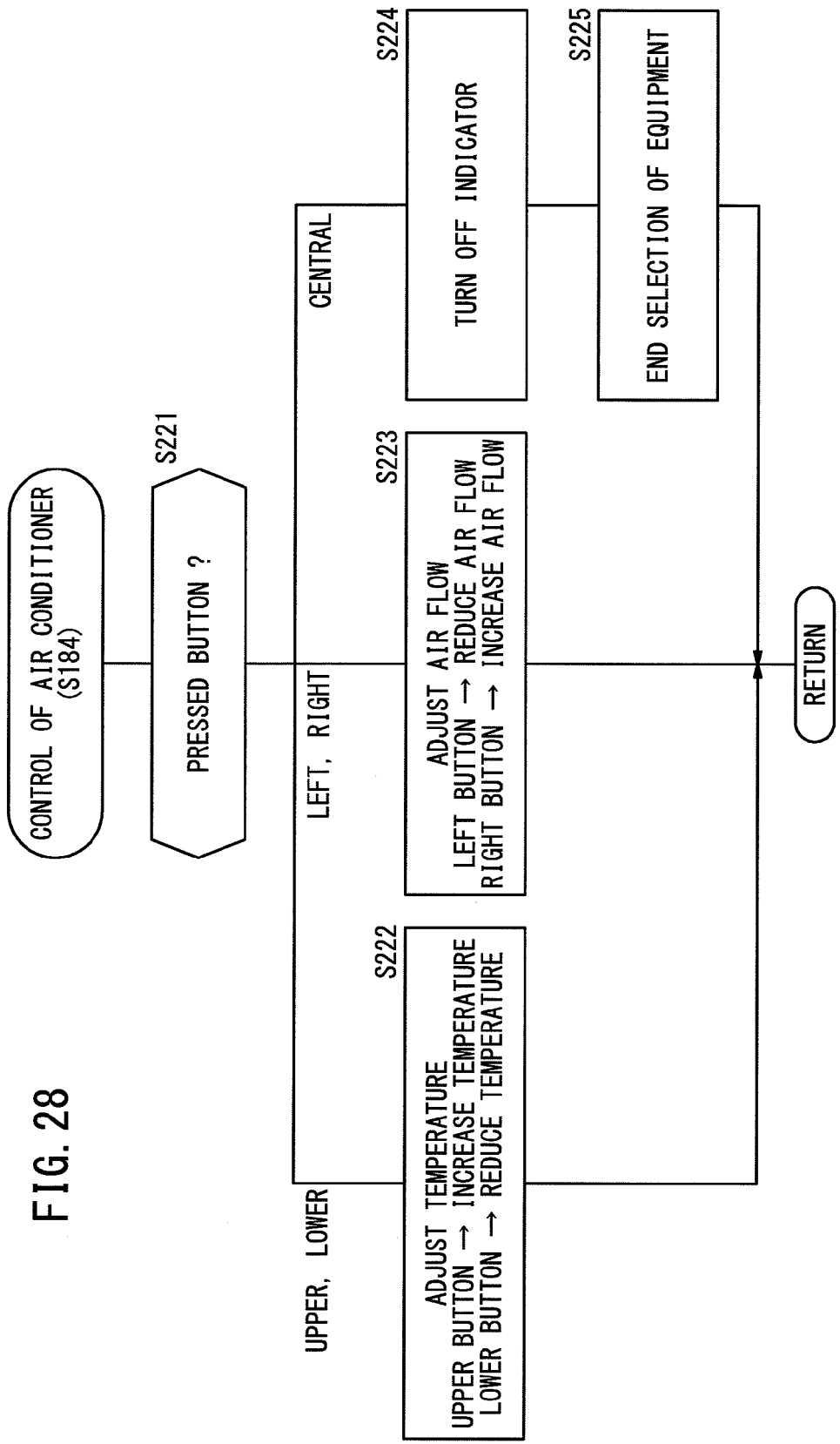
FIG. 28 is a flowchart of an operation sequence for controlling an air conditioner.

FIG. 28 is a flowchart of an operation sequence for controlling the air conditioner 44 (details of S184 in FIG. 25). In step S221, the ECU 24 judges whether a pressed button of the crisscross key 18 is the central button 30, the upper button 32, the lower button 34, the left button 36, or the right button 38.

If the pressed button is the upper button 32 or the lower button 34, then the ECU 24 adjusts the temperature setting of the air conditioner 44 in step S222. Specifically, if the upper button 32 is pressed, then the ECU 24 increases the temperature setting, and if the lower button 34 is pressed, then the ECU 24 reduces the temperature setting.

If the pressed button is the left button 36 or the right button 38, then the ECU 24 adjusts the air flow setting of the air conditioner 44 in step S223. Specifically, if the left button 36 is pressed, then the ECU 24 reduces the air flow setting, and if the right button 38 is pressed, then the ECU 24 increases the air flow setting.

If the pressed button is the central button 30, then the ECU 24 turns off the central indicator 26a in step S224. In step S225, the ECU 24 ends the selection of the target piece of equipment.

(5-6-5. Controlling of the HUD 46)

Figure 29:
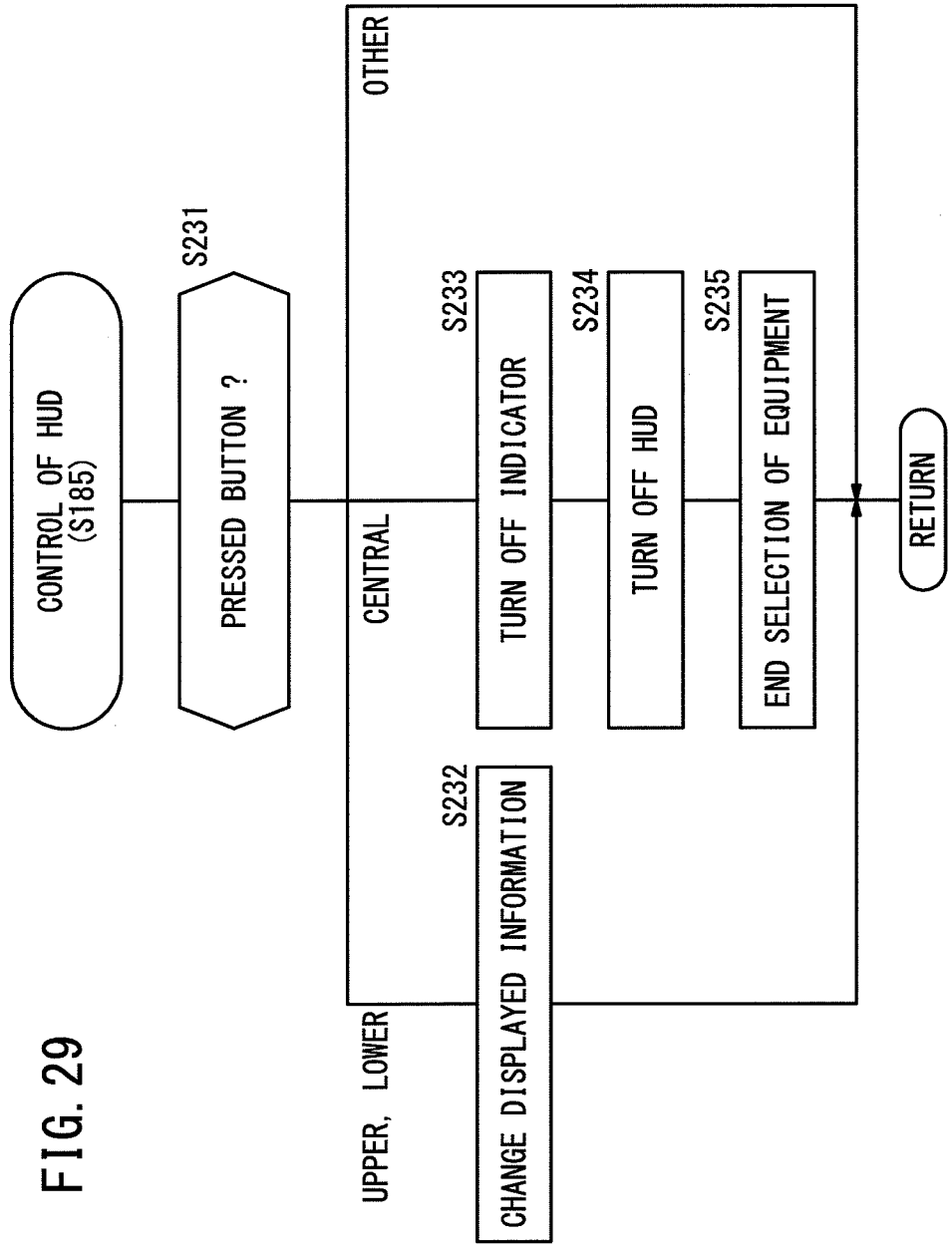
FIG. 29 is a flowchart of an operation sequence for controlling the HUD.

FIG. 29 is a flowchart of an operation sequence for controlling the HUD 46 (details of S185 in FIG. 25). In step S231, the ECU 24 judges whether the pressed button of the crisscross key 18 is the central button 30, the upper button 32, the lower button 34, or any of the other buttons.

If the pressed button is the upper button 32 or the lower button 34, then the ECU 24 changes the displayed information of the HUD 46 in step S232. For example, if the upper button 32 is pressed, then the ECU 24 changes the displayed information from the vehicle speed 110 to the traveled distance 112 to the fuel consumption 114 to the vehicle speed 110 to the traveled distance 112 and so on (see FIG. 7C). If the lower button 34 is pressed, then the ECU 24 changes the displayed information from the vehicle speed 110 to the fuel consumption 114 to the traveled distance 112 to the vehicle speed 110 to the fuel consumption 114 and so on.

If the pressed button is the central button 30, then the ECU 24 turns off the frontal indicator 26b in step S233. In step S234, the ECU 24 turns off the HUD 46. In step S235, the ECU 24 ends the selection of the target piece of equipment.

If the pressed button is any one of the other buttons (the left button 36 or the right button 38), then the ECU 24 puts the present cycle of the operation sequence.

(5-6-6. Controlling of the Hazard Lamp 48)

Figure 30:
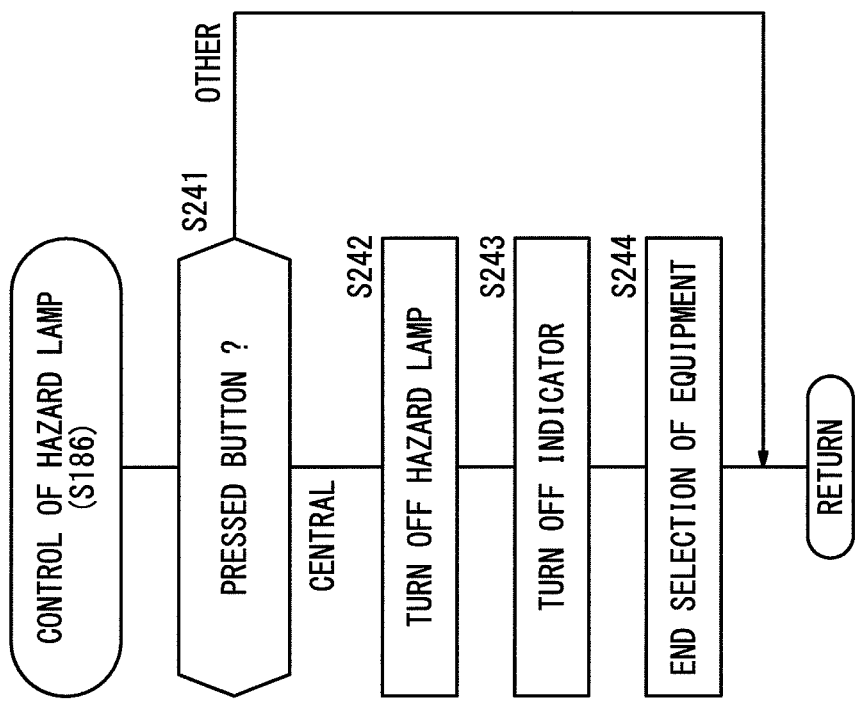
FIG. 30 is a flowchart of an operation sequence for controlling a hazard lamp.

FIG. 30 is a flowchart of an operation sequence for controlling the hazard lamp 48 (details of S186 in FIG. 25). In step S241, the ECU 24 judges whether the pressed button of the crisscross key 18 is the central button 30 or any of the other buttons.

If the pressed button is the central button 30, then the ECU 24 turns off the hazard lamp 48 in step S242. In step S243, the ECU 24 turns off the frontal indicator 26b. In step S244, the ECU 24 ends the selection of the target piece of equipment.

If the pressed button is any one of the other buttons (the upper button 32, the lower button 34, the left button 36, or the right button 38), then the ECU 24 puts an end to the present cycle of the operation sequence shown in FIG. 30.

(5-6-7. Controlling of the Seat 50)

Figure 31:
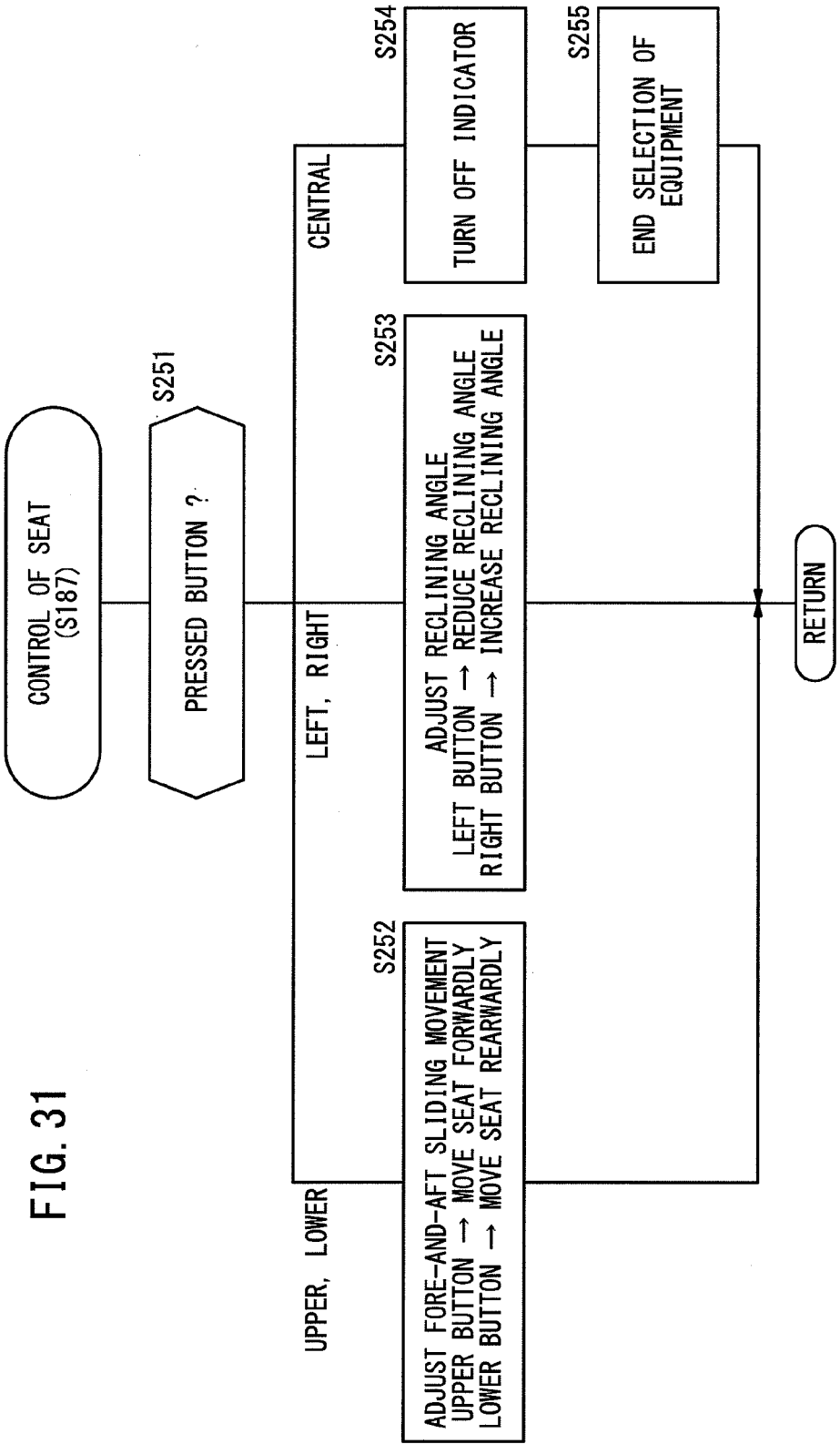
FIG. 31 is a flowchart of an operation sequence for controlling a driver seat.

FIG. 31 is a flowchart of an operation sequence for controlling the seat 50 for the driver 100 (details of S187 in FIG. 25). In step S251, the ECU 24 judges whether a pressed button of the crisscross key 18 is the central button 30, the upper button 32, the lower button 34, the left button 36, or the right button 38.

If the pressed button is the upper button 32 or the lower button 34, then the ECU 24 adjusts the fore-and-aft sliding movement of the seat 50 in step S252. Specifically, if the upper button 32 is pressed, then the ECU 24 moves the seat 50 forwardly, and if the lower button 34 is pressed, then the ECU 24 moves the seat 50 rearwardly.

If the pressed button is the left button 36 or the right button 38, then the ECU 24 adjusts the reclining angle of the seat 50 in step S253. Specifically, if the left button 36 is pressed, then the ECU 24 reduces the reclining angle, and if the right button 38 is pressed, then the ECU 24 increases the reclining angle.

If the pressed button is the central button 30, then the ECU 24 turns off the frontal indicator 26b in step S254. In step S255, the ECU 24 ends the selection of the target piece of equipment.

(5-6-8. Controlling of the Rear Lights 54)

Figure 32:
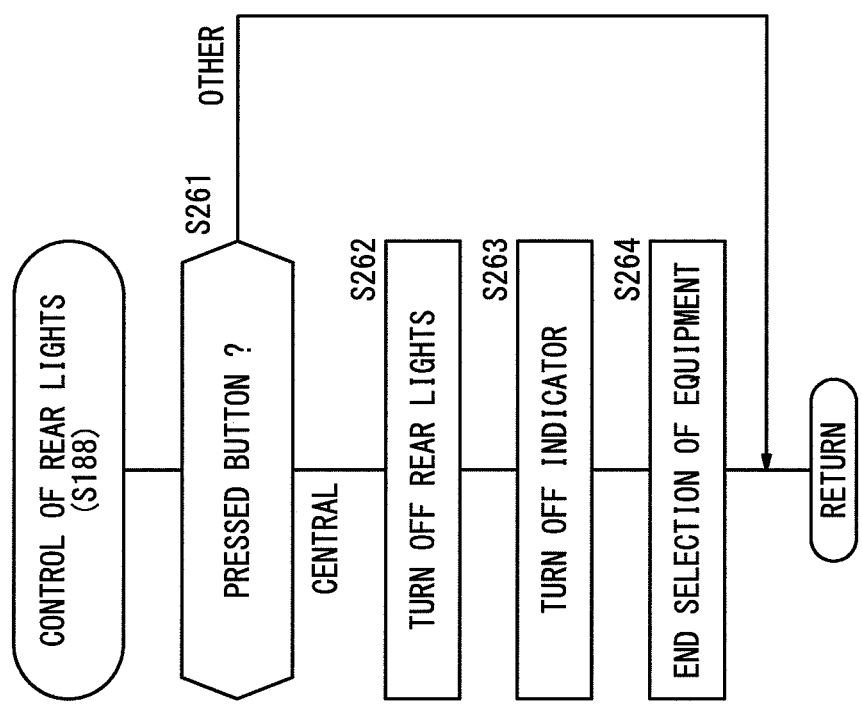
FIG. 32 is a flowchart of an operation sequence for controlling a rear light.

FIG. 32 is a flowchart of an operation sequence for controlling the rear lights 54 (details of S188 in FIG. 25). In step S261, the ECU 24 judges whether the pressed button of the crisscross key 18 is the central button 30 or any of the other buttons.

If the pressed button is the central button 30, then the ECU 24 turns off the rear lights 54 in step S262. In step S263, the ECU 24 turns off the right indicator 26c or the left indicator 26d which has been kept on. In step S264, the ECU 24 ends the selection of the target piece of equipment.

If the pressed button is any one of the other buttons (the upper button 32, the lower button 34, the left button 36, or the right button 38), then the ECU 24 puts an end to the present cycle of the operation sequence.

(5-6-9. Controlling of the Driver Seat Side Window 56)

Figure 33:
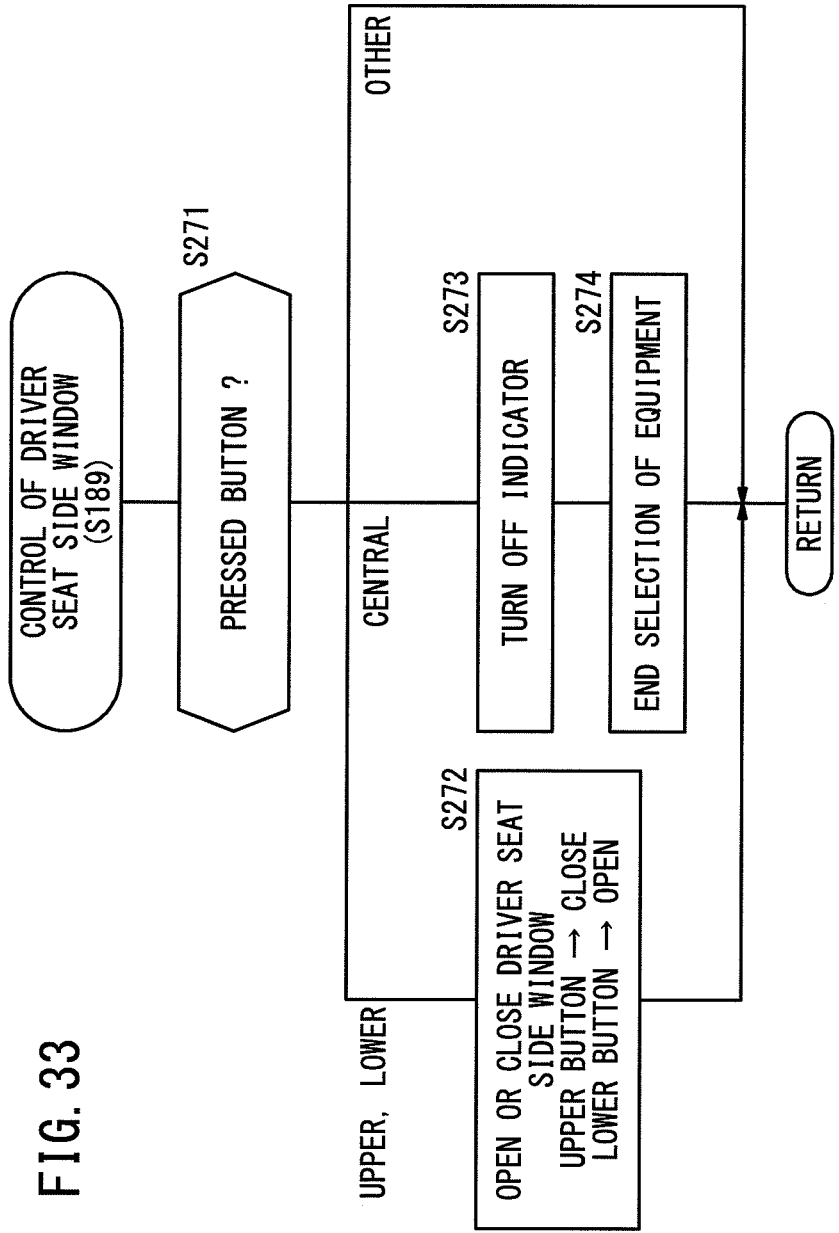
FIG. 33 is a flowchart of an operation sequence for controlling a driver seat side window.

FIG. 33 is a flowchart of an operation sequence for controlling the driver seat side window 56 (details of S189 in FIG. 25). In step S271, the ECU 24 judges whether the pressed button of the crisscross key 18 is the central button 30, the upper button 32, the lower button 34, or any one of the other buttons.

If the pressed button is the upper button 32 or the lower button 34, then the ECU 24 opens or closes the driver seat side window 56 in step S272. Specifically, if the lower button 34 is pressed, then the ECU 24 opens the driver seat side window 56, and if the upper button 32 is pressed, the ECU 24 closes the driver seat side window 56.

If the pressed button is the central button 30, then the ECU 24 turns off the right indicator 26c in step S273. In step S274, the ECU 24 ends the selection of the target piece of equipment.

If the pressed button is any one of the other buttons (the left button 36 or the right button 38), then the ECU 24 puts the present cycle of the operation sequence.

(5-6-10. Controlling of the Front Passenger Seat Side Window 58)

Figure 34:
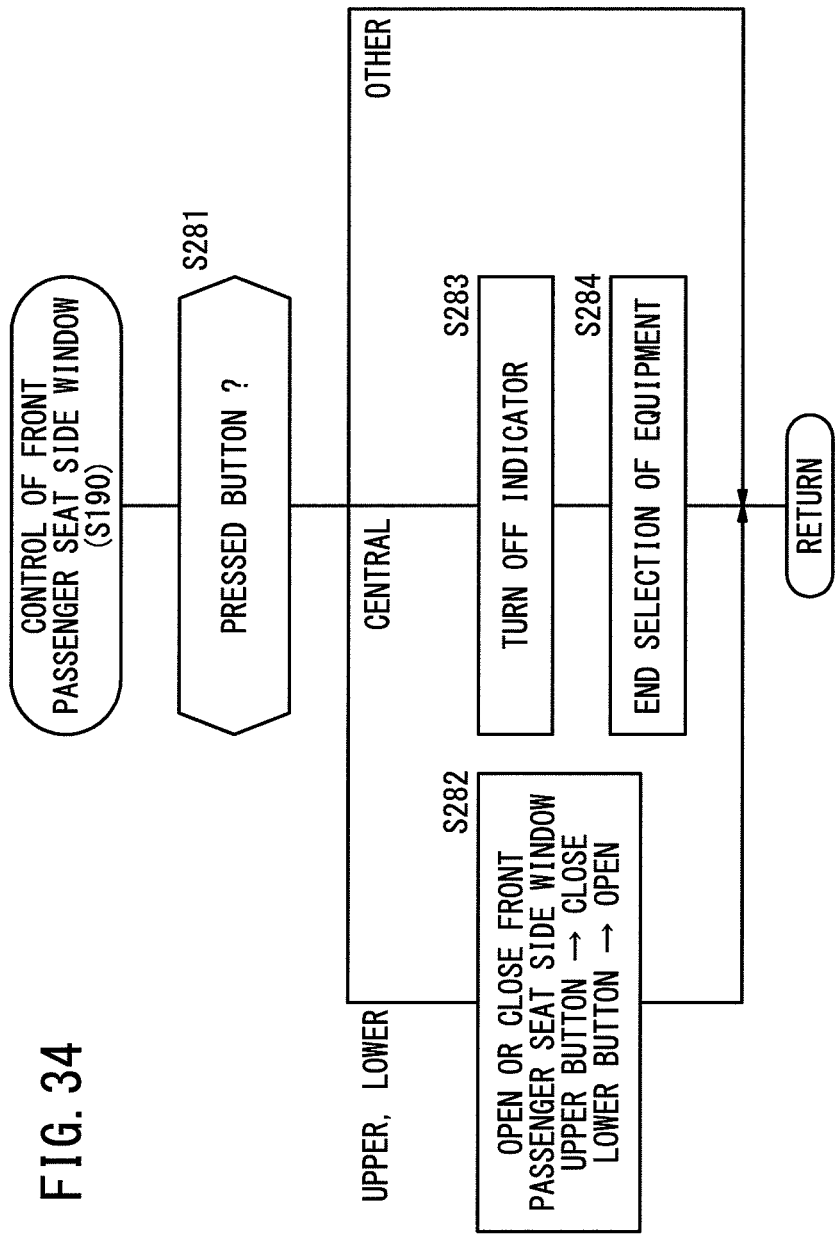
FIG. 34 is a flowchart of an operation sequence for controlling the front passenger seat side window.

FIG. 34 is a flowchart of an operation sequence for controlling the front passenger seat side window 58 (details of S190 in FIG. 25). In step S281, the ECU 24 judges whether the pressed button of the crisscross key 18 is the central button 30, the upper button 32, the lower button 34, or any one of the other buttons.

If the pressed button is the upper button 32 or the lower button 34, then the ECU 24 opens or closes the front passenger seat side window 58 in step S282. Specifically, if the lower button 34 is pressed, then the ECU 24 opens the front passenger seat side window 58, and if the upper button 32 is pressed, the ECU 24 closes the front passenger seat side window 58.

If the pressed button is the central button 30, then the ECU 24 turns off the left indicator 26d in step S283. In step S284, the ECU 24 ends the selection of the target piece of equipment.

If the pressed button is any one of the other buttons (the left button 36 or the right button 38), then the ECU 24 puts the present cycle of the operation sequence.

6. Advantages of the Present Embodiment

According to the present embodiment, as described above, one of the vehicle-mounted equipment groups in the widthwise directions of the vehicle 10 (groups A through D) is specified based on the direction X of gaze of the driver 100 (occupant), and a piece 20 of vehicle-mounted equipment in the specified vehicle-mounted equipment group is specified by the driver 100 using the crisscross key 18. Therefore, the driver 100 does not need to gaze at any one of the pieces 20 of vehicle-mounted equipment to be specified, but may only be required to turn its line of sight or its face toward the vehicle-mounted equipment group (in the widthwise directions of the vehicle 10) in which a piece 20 of vehicle-mounted equipment to be specified is present. Therefore, it is possible to reduce the number of factors responsible for impairing attention directed forwardly of the vehicle 10, and also to prevent a target piece of equipment from being determined in error. As it is not necessary to judge whether the driver 100 gazes at each piece 20 of vehicle-mounted equipment or not, there is no need for a highly accurate line-of-sight/face direction detecting technology. Consequently, the controlling apparatus 12 is prevented from becoming highly costly in its entirety.

According to the present embodiment, the crisscross key 18 has the upper button 32, the lower button 34, and the central button 30 that are assigned to selectable vertical positions. Since the upper button 32, the lower button 34, and the central button 30 are assigned to the selectable vertical positions that represent the pieces 20 of vehicle-mounted equipment belonging to one vehicle-mounted equipment group, it is possible to shorten the period of time required to select a target piece of equipment, and to select a target piece of equipment reliably. Therefore, the controlling apparatus 12 is highly convenient to use.

According to the present embodiment, the crisscross key 18 doubles as a control input unit for entering a certain control input for a target piece of equipment that has been specified depending on the detection of the direction X of gaze of the driver 100 and the controlling of the crisscross key 18. A vertical direction selecting unit, e.g., an equipment selecting switch, and a control input unit, e.g., an equipment controlling switch, may be combined into a common control unit which requires a reduced installation space and which is of a reduced cost. The crisscross key 18 also allows blind control actions to be easily entered.

According to the present embodiment, the ECU 24 detects the angle of the face direction of the driver 100 in the widthwise directions of the vehicle 10 based on the image acquired by the occupant camera 14, and detects the direction X of gaze of the driver 100 based on the detected angle of the face direction. Inasmuch as the angle of the face direction of the driver 100 in the widthwise directions may be determined according to an image processing process, the controlling apparatus 12 does not need to have a highly accurate image processing process and devices such as infrared LEDs, etc. for detecting the line of sight based on the detection of bright spots on pupils, and hence is low in cost.

According to the present embodiment, an individual piece 20 of equipment in a specified one of the vehicle-mounted equipment groups (the groups A through D) is selected using the crisscross key 18 on the steering wheel 16, and vertical positions for selecting pieces 20 of vehicle-mounted equipment from each of the vehicle-mounted equipment groups are assigned to the vertical positions (the upper button 32, the lower button 34, and the central button 30) on the crisscross key 18. Since the crisscross key 18 allows the driver 100 to control the pieces 20 of vehicle-mounted equipment without moving its hands off the steering wheel 16, the driver 100 finds the controlling apparatus 12 convenient to use. In addition, since the selectable positions are assigned to the vertical positions on the crisscross key 18, the driver 100 can select pieces 20 of vehicle-mounted equipment intuitively and can enter blind control actions easily through the crisscross key 18.

According to the present embodiment, the indicators 26a through 26d for indicating the vehicle-mounted equipment groups (the groups A through D) that are specified based on the direction X of gaze of the driver 100 are provided respectively in combination with the vehicle-mounted equipment groups (the groups A through D). The controlling apparatus 12 is thus made lower in cost than if there are indicators 26 assigned respectively to all the pieces 20 of vehicle-mounted equipment, though the controlling apparatus 12 maintains accuracy in specifying pieces of vehicle-mounted equipment, i.e., preventing the state of the vehicle 10 from deviating from pieces of vehicle-mounted equipment recognized by the driver 100.

According to the present embodiment, one of the vehicle-mounted equipment groups (the groups A through D) in the widthwise directions of the vehicle 10 which is specified based on the direction X of gaze of the driver 100 is indicated by the corresponding one of the indicators 26a through 26e. At least the indicators 26a, 26b, 26e have the same widths as the regions A1, A2, A5 that correspond to the vehicle-mounted equipment groups (the groups A, B) in the widthwise directions of the vehicle 10, and are arrayed on the instrument panel 59 along the widthwise directions of the vehicle 10. Therefore, the driver 100 is capable of visually recognizing the boundaries and widths of the regions A1 through A5 and of recognizing a specified vehicle-mounted equipment group as it switches from one group to another. It is thus possible for the driver 100 to reliably specify a piece 20 of vehicle-mounted equipment in the widthwise directions of the vehicle 10 by making a minimum change in the line of sight or the face direction.

Even if the direction X of gaze intended by the driver 100 and the direction X of gaze detected by the controlling apparatus 12 deviate from each other, the driver 100 can recognize such a deviation because of the existence of the indicators 26a through 26e that indicate the detected direction X of gaze, and can appropriately adjust the direction X of gaze.

According to the present embodiment, furthermore, inasmuch as the line of sight or the face direction of the driver 100 is used only for specifying the vehicle-mounted equipment groups (the groups A through D) in the widthwise directions of the vehicle 10, the line of sight or the face direction may be detected only in the widthwise directions of the vehicle 10. As the line of sight or the face direction does not need to be detected in other directions, e.g., vertical directions, than the widthwise directions of the vehicle 10, it is possible to simplify the process of detecting the line of sight or the face direction.

According to the present embodiment, the boundary lines 28a through 28d between the regions A1 through A5 (the indicators 26a through 26e) are indicated by the display device 22 even when the vehicle-mounted equipment groups (the groups A through D) are not specified by the ECU 24 (the vehicle-mounted equipment group specifying function 72). The driver 100 can thus reliably recognize the boundary lines 28a through 28d, and understand to which region the driver 100 should turn the line of sight or the face direction for selecting a particular vehicle-mounted equipment group.

According to the present embodiment, the controlling apparatus 12 has the crisscross key 18 which is located at a position different from the pieces 20 of vehicle-mounted equipment and which can be operated by the driver 100. The ECU 24 (the individual vehicle-mounted equipment specifying function 74) specifies one of the vehicle-mounted equipment groups (the groups A through D) based on the detected direction X of gaze, and specifies one of the pieces 20 of vehicle-mounted equipment belonging to the specified vehicle-mounted equipment group based on a direction that is selected by the crisscross key 18 when the vehicle-mounted equipment group is specified. The indicators 26a through 26e change the displayed color depending on the piece 20 of vehicle-mounted equipment that is specified by the individual vehicle-mounted equipment specifying function 74. The driver 100 can thus immediately understand which piece 20 of vehicle-mounted equipment is selected in one vehicle-mounted equipment group.

According to the present embodiment, the indicators 26a through 26e have their widths adjustable. Consequently, even if the direction X of gaze detected by the direction-of-gaze detecting function 70 and the actual direction X of gaze deviate from each other, it is possible to adjust and detect the direction X of gaze reasonably in line with the actual direction X of gaze.

According to the present embodiment, the controlling apparatus 12 includes the indicators 26a through 26e for visually indicating the regions A1 through A5 that correspond to detected directions X of gaze or specified vehicle-mounted equipment groups (groups A through D). The indicators 26a through 26e are successively arranged along the widthwise directions of the vehicle 10 in association with the respective regions A1 through A5 in the lower periphery of the front windshield 11, indicating the boundaries between the adjacent regions A1 through A5. The driver 100 is thus capable of visually recognizing the boundaries and widths of the regions A1 through A5, and recognizing a selected one of the regions A1 through A5 as it switches from one region to another. It is thus possible for the driver 100 to reliably specify a piece 20 of vehicle-mounted equipment in the widthwise directions of the vehicle 10 by making a minimum change in the line of sight or the face direction.

Even if the direction X of gaze intended by the driver 100 and the direction X of gaze detected by the controlling apparatus 12 deviate from each other, it is possible for the driver 100 to recognize such a deviation because of the existence of the indicators 26a through 26e that visually indicate the detected direction X of gaze, and to appropriately adjust the direction X of gaze.

7. Modifications

The present invention is not limited to the above embodiment, but may employ various arrangements based on the disclosure of the present description. For example, the present invention may employ the following arrangements:

[7-1. Objects Incorporating the Invention]

In the above embodiment, the controlling apparatus 12 is incorporated in the vehicle 10. However, the controlling apparatus 12 may be incorporated in other objects, e.g., mobile objects such as ships, aircrafts, or the like. Alternatively, the controlling apparatus 12 may be incorporated not in mobile objects, but in other objects that need to specify the direction of gaze of a person to be detected.

[7-2. Detection of the Direction of Gaze]

The occupant as an object whose direction X of gaze is to be detected is not limited to the driver 100, but may be any one of other occupants (such as an occupant seated on the front passenger seat and occupants seated on rear passenger seats).

Figure 35:
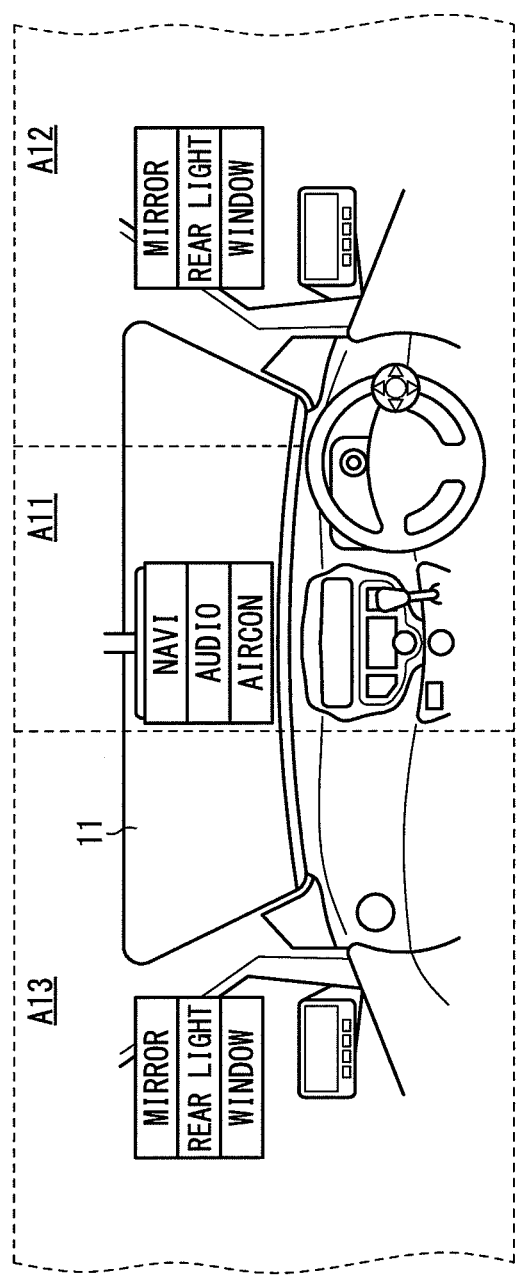
FIG. 35 is a view showing three regions into which the peripheral area of the front windshield is divided, according to a modification of the division shown in FIG. 5.

In the above embodiment, the peripheral area of the front windshield 11 is divided into the five regions A1 through A5 (FIG. 5). However, the number of regions is optional. The peripheral area of the front windshield 11 may be divided into three regions A11 through A13, as shown in FIG. 35.

[7-3. Specifying of a Target Piece of Equipment]

In the above embodiment, positions along the widthwise directions of the vehicle 10 are specified based on the direction X of gaze and positions along the vertical directions of the vehicle 10 are specified by the crisscross key 18. However, these positions may be specified otherwise insofar as the direction X of gaze is indicated by the indicators 26a through 26e. For example, positions along the vertical directions of the vehicle 10 may be specified based on the direction X of gaze (at least one of the face direction and the direction of the line of sight), or only one piece 20 of vehicle-mounted equipment may be established in each position along the vertical directions, and a piece 20 of vehicle-mounted equipment may be specified based on a specified position along the widthwise directions of the vehicle 10. Alternatively, the indicators 26a through 26e may be arranged in a vertical array for indicating the direction X of gaze along the vertical directions.

In the above embodiment, a target piece of equipment is specified according to the flowcharts shown in FIGS. 11, 18, and 20 through 24. However, a target piece of equipment may be specified otherwise insofar as the vehicle-mounted equipment groups (the groups A through D) are specified in the widthwise directions of the vehicle 10 and a target piece of equipment is specified in the vertical directions of the vehicle 10. For example, according to the flowchart shown in FIG. 18, it is judged in step S34 whether any one of the buttons of the crisscross key 18 is pressed or not. However, such a judgment may be omitted (e.g., combined with step S111 shown in FIG. 20). According to the flowcharts shown in FIGS. 21 through 24, one of the indicators 26a through 26d is turned on depending on a selected target piece of equipment. However, the indicators 26a through 26d may not be turned on.

[7-4. Control Unit]

In the above embodiment, the crisscross key 18 is used as a unit (control unit) that is controlled by the driver 100 (occupant) for specifying a target piece of equipment. However, the control unit is not limited to the crisscross key 18 insofar as it is used to specify or select target pieces 20 of equipment that are arrayed vertically in each of the vehicle-mounted equipment groups (the groups A through D). For example, whereas the crisscross key 18 according to the embodiment has the central button 30, the upper button 32, the lower button 34, the left button 36, and the right button 38, the control unit may have only the upper button 32 and the lower button 34 or may have only the central button 30, the upper button 32, and the lower button 34. Alternatively, the buttons may be joined together (see, for example, a crisscross button shown in FIG. 4 of JP2010-105417A). Furthermore, while each of the buttons of the crisscross key 18 according to the above embodiment comprises a push switch (see FIG. 3), it may be one of other switches such as a slide switch, a lever switch, etc.

In the above embodiment, the crisscross key 18 doubles as a unit (control unit) for specifying a target piece of equipment in the vehicle-mounted equipment groups (the groups A through D) and a unit (control input unit) for controlling a specified target piece of equipment. However, the unit for controlling a specified target piece of equipment may be provided separately.

In the above embodiment, the crisscross key 18 is mounted on the steering wheel 16. However, the crisscross key 18 may be positioned otherwise. For example, the crisscross key 18 may be disposed in a position on the steering column or the instrument panel.

[7-5. Pieces 20 of Vehicle-Mounted Equipment and Vehicle-Mounted Equipment Groups]

In the above embodiment, the pieces 20 of vehicle-mounted equipment include the navigation device 40, the audio device 42, the air conditioner 44, the HUD 46, the hazard lamp 48, the driver seat 50, the door mirrors 52, the rear lights 54, the driver seat side window 56, and the front passenger seat side window 58. However, the pieces 20 of vehicle-mounted equipment are not limited to those described above insofar as a plurality of pieces of vehicle-mounted equipment which can be selected and controlled by the occupant of the vehicle 10 are vertically arrayed in a plurality of vehicle-mounted equipment groups (groups) that are arranged along the widthwise directions of the vehicle 10.

The vehicle-mounted equipment groups (groups) may not necessarily be arranged along the widthwise directions of the vehicle 10. The present invention is applicable where at least one vehicle-mounted equipment group is disposed in a particular region along the widthwise directions of the vehicle 10. Stated otherwise, the present invention is applicable where a vehicle-mounted equipment group is specified in the widthwise directions of the vehicle 10 based on the direction of gaze of the occupant and a piece 20 of vehicle-mounted equipment in the specified vehicle-mounted equipment group is specified by the control unit. Therefore, the present invention is applicable where at least one vehicle-mounted equipment group including a plurality of pieces 20 of vehicle-mounted equipment is provided. Furthermore, one vehicle-mounted equipment group may be provided along the widthwise directions of the vehicle 10, and a single piece 20 of vehicle-mounted equipment may be disposed separately along the widthwise directions of the vehicle 10.

Alternatively, insofar as a selected vehicle-mounted equipment group or an individual piece 20 of vehicle-mounted equipment is indicated, a plurality of pieces of vehicle-mounted equipment that can be controlled by the occupant of the vehicle 10 may be disposed along the widthwise directions of the vehicle 10. In this case, one piece of vehicle-mounted equipment may be disposed in each of the regions A1 through A5.

[7-6. Direction-of-Gaze Display Device 22 (Indicators 26a Through 26e)]

In the above embodiment, the display device 22 (the indicators 26a through 26e) is mounted on the instrument panel 59 in the periphery of the lower portion of the front windshield 11. However, the display device 22 may be mounted on a lower or upper portion of the front windshield 11 or in the periphery thereof. For example, the display device 22 (the indicators 26a through 26e) may be mounted on the upper portion of the front windshield 11. If the HUD 46 has a widened area, then the display device 22 (the indicators 26a through 26e) may be configured as a portion of the HUD 46.

In the above embodiment, each of the indicators 26a through 26e is turned on continuously along the widthwise directions of the vehicle 10. However, insofar as they indicate the boundaries between the adjacent regions A1 through A5, each of the indicators 26a through 26e may be of an interrupted configuration so that a portion thereof will not be turned on.

In the above embodiment, if a target piece of equipment is not selected, then only one of the indicators 26a through 26e that corresponds to the direction X of gaze is turned on, and the other indicators are turned off. However, all the indicators 26a through 26e may be turned on, and one of the indicators 26a through 26e that corresponds to the direction X of gaze may display a different color.

In the above embodiment, the indicators 26a through 26e are associated with all the regions A1 through A5. However, insofar as a selected region is indicated, at least two of the indicators 26a through 26e may be provided.

In the above embodiment, a selected piece 20 of the vehicle-mounted equipment is indicated by a change in the color of a corresponding one of the indicators 26a through 26e. However, a selected piece 20 of the vehicle-mounted equipment may be indicated by a varied blinking pattern of a corresponding one of the indicators 26a through 26e. Alternatively, a selected piece 20 of the vehicle-mounted equipment may be indicated by a speech output from the navigation device 40. These alternatives may be combined with each other.

In the above embodiment, the indicators 26a through 26e are turned on to display uninterruptedly. However, the indicators 26a through 26e may be turned on to display only when a certain control action or setting is made for starting to select a target piece of equipment. Alternatively, a component such as a button or the like may be provided for making such a certain control action or setting.

Figure 36:
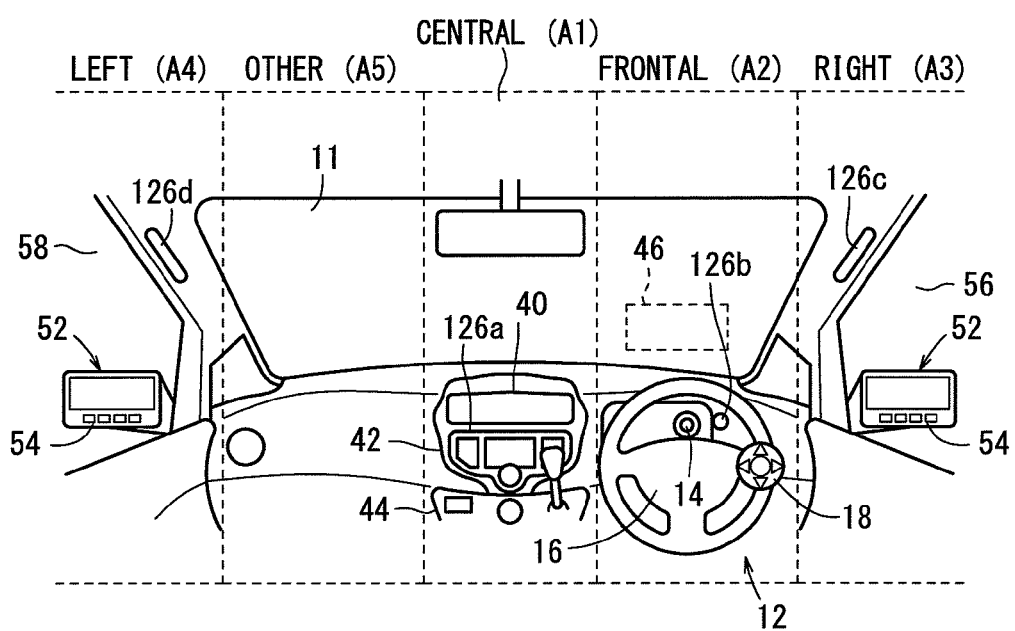
FIG. 36 is a view showing an arrangement in which pilot lamps are used instead of the indicator according to the embodiment.

In the above embodiment, the direction-of-gaze display device 22 having the indicators 26a through 26e is employed. However, other display devices or lighting devices may be employed insofar as pieces 20 of vehicle-mounted equipment are selected. For example, as shown in FIG. 36, four pilot lamps 126a through 126d may be provided in association with regions A1 through A4. Specifically, the four pilot lamps 126a through 126d include a central pilot lamp 126a, a frontal pilot lamp 126b, a right pilot lamp 126c, and a left pilot lamp 126d that are associated respectively with vehicle-mounted equipment groups A through D (groups A through D). As with the indicators 26a through 26e, the pilot lamps 126a through 126d are used to indicate a detected direction X of gaze (or a corresponding one of the regions A1 through A4) and a controlled state of the crisscross key 18.

Alternatively, insofar as pieces 20 of vehicle-mounted equipment are selected, the indicators 26a through 26d and the pilot lamps 126a through 126d may be dispensed with for a reduced cost and less awkward operations. Further alternatively, the indicators 26a through 26d or the pilot lamps 126a through 126d may be associated with the respective pieces 20 of vehicle-mounted equipment in order for the driver 100 to instantaneously grasp a piece 20 of vehicle-mounted equipment that is currently controllable.

The invention claimed is:

1. A vehicle-mounted equipment controlling apparatus comprising:
   a plurality of pieces of vehicle-mounted equipment mounted on a vehicle and controllable by an occupant of the vehicle;
   a direction-of-gaze detecting unit for detecting a direction of gaze of the occupant based on a direction of a line of sight or a face direction of the occupant;
   a vehicle-mounted equipment specifying unit for specifying any one of the pieces of vehicle-mounted equipment based on the direction of gaze detected by the direction-of-gaze detecting unit; and
   a control unit disposed in a position different from the pieces of vehicle-mounted equipment and controllable by the occupant;
   wherein the pieces of vehicle-mounted equipment are arrayed in widthwise directions of the vehicle and in vertical directions transverse to the widthwise directions, and divided into a plurality of vehicle-mounted equipment groups respectively in a plurality of predetermined regions along the widthwise directions of the vehicle;
   the control unit has a vertical direction selecting unit for selecting the pieces of vehicle-mounted equipment in the vertical directions from the vehicle-mounted equipment group; and
   the vehicle-mounted equipment specifying unit specifies one vehicle-mounted equipment group from among the plurality of vehicle-mounted equipment groups based on the direction of gaze detected by the direction-of-gaze detecting unit, and specifies either one of the pieces of vehicle-mounted equipment in the specified vehicle-mounted equipment group based on a vertical direction selected by the vertical direction selecting unit when the vertical direction selecting unit is controlled while the vehicle-mounted equipment group is being specified.

2. The vehicle-mounted equipment controlling apparatus according to claim 1, wherein the vertical direction selecting unit comprises individual control switches assigned respectively to the selectable vertical directions.

3. The vehicle-mounted equipment controlling apparatus according to claim 1, wherein the vertical direction selecting unit doubles as a control input unit for entering a particular control input for the specified piece of vehicle-mounted equipment when the piece of vehicle-mounted equipment is specified by the vehicle-mounted equipment specifying unit.

4. The vehicle-mounted equipment controlling apparatus according to claim 1, wherein the direction-of-gaze detecting unit comprises:
   an image capturing unit disposed in a cabin of the vehicle for capturing an image including the occupant; and
   an angle-of-face-direction detecting unit for detecting an angle of the face direction of the occupant in the widthwise directions of the vehicle based on the image captured by the image capturing unit;
   wherein the direction-of-gaze detecting unit detects the direction of gaze of the occupant based on the angle of the face direction detected by the angle-of-face-direction detecting unit.

5. The vehicle-mounted equipment controlling apparatus according to claim 1, wherein the vertical direction selecting unit comprises a crisscross switch mounted on a steering wheel of the vehicle, and the selectable vertical directions are assigned to respective vertical directions on the crisscross switch as the steering wheel is viewed in front elevation.

6. The vehicle-mounted equipment controlling apparatus according to claim 1, further comprising:
   an indicating unit provided for each of the vehicle-mounted equipment groups, for indicating the vehicle-mounted equipment group specified by the vehicle-mounted equipment specifying unit.

7. An indicating apparatus comprising:
   a plurality of pieces of vehicle-mounted equipment mounted on a vehicle and controllable by an occupant of the vehicle, the plurality of pieces of vehicle-mounted equipment being arrayed in widthwise directions of the vehicle and in vertical directions transverse to the widthwise directions, and divided into a plurality of vehicle-mounted equipment groups respectively in a plurality of predetermined regions along the widthwise directions of the vehicle;
   a direction-of-gaze detecting unit for detecting a direction of gaze of the occupant based on a direction of a line of sight or a face direction of the occupant;
   a control unit disposed in a position different from the pieces of vehicle-mounted equipment and controllable by the occupant;
   a vehicle-mounted equipment specifying unit for specifying one vehicle-mounted equipment group from among the plurality of vehicle-mounted equipment groups of the plurality of pieces of vehicle-mounted equipment based on the direction of gaze detected by the direction-of-gaze detecting unit; and
   an indicating unit for indicating the vehicle-mounted equipment group specified by the vehicle-mounted equipment specifying unit;
   wherein the indicating unit has widths equivalent to respective widths of the predetermined regions, and are arrayed along the widthwise directions of the vehicle on an instrument panel of the vehicle, and
   wherein the control unit has a vertical direction selecting unit for selecting the pieces of vehicle-mounted equipment in the vertical directions from the vehicle-mounted equipment group, and
   wherein the vehicle-mounted equipment specifying unit specifies one of the pieces of vehicle-mounted equipment in the specified one vehicle-mounted equipment group based on the vertical direction selected by the vertical direction selecting unit while the vehicle-mounted equipment group is being specified.

8. The indicating apparatus according to claim 7, wherein the predetermined regions have boundary lines which are indicated by the indicating unit even when the vehicle-mounted equipment group is not specified by the vehicle-mounted equipment specifying unit.

9. The indicating apparatus according to claim 7,
   wherein
   the indicating unit changes an indicating process depending on the piece of vehicle-mounted equipment specified by the vehicle-mounted equipment specifying unit.

10. The indicating apparatus according to claim 7, wherein the indicating unit is capable of adjusting the widths thereof.

11. A vehicle-mounted equipment controlling apparatus, comprising:
    a plurality of pieces of vehicle-mounted equipment mounted on a vehicle and controllable by an occupant of the vehicle;

a direction-of-gaze detecting unit for detecting a direction of gaze of the occupant based on a direction of a line of sight or a face direction of the occupant;

a vehicle-mounted equipment specifying unit for specifying any one of the pieces of vehicle-mounted equipment based on the direction of gaze detected by the direction-of-gaze detecting unit; and a control unit disposed in a position different from the pieces of vehicle-mounted equipment and controllable by the occupant, wherein the pieces of vehicle-mounted equipment are arrayed in widthwise directions of the vehicle and in vertical directions transverse to the widthwise directions, and divided into a plurality of vehicle-mounted equipment groups respectively in a plurality of predetermined regions along the widthwise directions of the vehicle, the control unit has a vertical direction switch for selecting the pieces of vehicle-mounted equipment in the vertical directions from the vehicle-mounted equipment group, and the vehicle-mounted equipment specifying unit specifies one vehicle-mounted equipment group from among the plurality of vehicle-mounted equipment groups based on the direction of gaze detected by the direction-of-gaze detecting unit, and specifies either one of the pieces of vehicle-mounted equipment in the specified vehicle-mounted equipment group based on a vertical direction selected by the vertical direction switch when the vertical direction switch is controlled while the vehicle-mounted equipment group is being specified.

* * * * *